(12) United States Patent
Lang et al.

(10) Patent No.: US 12,491,482 B2
(45) Date of Patent: Dec. 9, 2025

(54) NANOCARRIER MANUFACTURING

(71) Applicant: Evonik Operations GmbH, Essen (DE)

(72) Inventors: Jürgen Erwin Lang, Karlsruhe (DE); Mario Gomez, Darmstadt (DE); Marcel Arndt, Moerfelden-Walldorf (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 19/109,456

(22) PCT Filed: Sep. 1, 2023

(86) PCT No.: PCT/EP2023/074026
§ 371 (c)(1),
(2) Date: Mar. 6, 2025

(87) PCT Pub. No.: WO2024/052225
PCT Pub. Date: Mar. 14, 2024

(65) Prior Publication Data
US 2025/0256248 A1    Aug. 14, 2025

(30) Foreign Application Priority Data
Sep. 8, 2022   (EP) .................... 22194645

(51) Int. Cl.
*B01F 23/00*    (2022.01)
*A61K 9/51*    (2006.01)
(Continued)

(52) U.S. Cl.
CPC ............ *B01F 23/49* (2022.01); *A61K 9/5123* (2013.01); *A61K 9/5192* (2013.01);
(Continued)

(58) Field of Classification Search
CPC .......... B01F 23/49; B01F 25/53; B01F 25/51; B01F 25/4334; B01F 35/712;
(Continued)

(56) References Cited

U.S. PATENT DOCUMENTS

| 7,811,603 B2 | 10/2010 | Lee et al. |
| 11,969,507 B2 | 4/2024 | Gomez et al. |

(Continued)

FOREIGN PATENT DOCUMENTS

| EP | 1 519 714 B1 | 10/2010 |
| EP | 3 271 057 B1 | 9/2019 |

(Continued)

OTHER PUBLICATIONS

Enders et al., "3D Printed Microfluidic Mixers—A Comparative Study on Mixing Unit Performances", Small, vol. 15, Dec. 10, 2018, pp. 1804326-1-1804326-9.

(Continued)

*Primary Examiner* — Anshu Bhatia
(74) *Attorney, Agent, or Firm* — Grüneberg and Myers PLLC

(57) ABSTRACT

Present invention relates to an apparatus (0) for producing nanocarriers and/or nanoformulation and a process for producing a nanocarrier and/or a nanoformulation by means of this apparatus (0). According to inventive preparation, a first liquid phase (A) and the second liquid phase (B) are mixed first to give the primary mixture (A+B) by means of a static mixer (4). In a subsequence mixing step primary mixture (A+B) is diluted with a third liquid (C). An important aspect of apparatus (0) is the arrangement of the static mixer (4) inside a linear pipe (7) conducting third liquid phase (C). Thus, the primary mixture (A+B) exiting the mixer (4) is instantaneously diluted with (C) to give secondary mixture (A+B+C). The volume flow of the third mixture (C) is (Continued)

chosen larger than the volume flow of the primary mixture (A+B). By these measures, nanocarriers with improved morphology and homogeneity are produced. Encapsulation efficiency was enhanced as well.

19 Claims, 14 Drawing Sheets

(51) Int. Cl.
*B01F 23/40* (2022.01)
*B01F 23/45* (2022.01)
*B01F 25/4314* (2022.01)
*B01F 25/433* (2022.01)
*B01F 25/51* (2022.01)
*B01F 25/53* (2022.01)
*B01F 35/71* (2022.01)

(52) U.S. Cl.
CPC ............ *B01F 23/405* (2022.01); *B01F 23/45* (2022.01); *B01F 25/43141* (2022.01); *B01F 25/4334* (2022.01); *B01F 25/51* (2022.01); *B01F 25/53* (2022.01); *B01F 35/712* (2022.01); *B01F 2215/0431* (2013.01); *B01F 2215/0486* (2013.01)

(58) Field of Classification Search
CPC .. B01F 23/405; B01F 25/43141; B01F 23/45; B01F 2215/0431; B01F 2215/0486; A61K 9/5123; A61K 9/5192
See application file for complete search history.

(56) References Cited

U.S. PATENT DOCUMENTS

| | | |
|---|---|---|
| 2015/0196510 A1* | 7/2015 | Reed ................... A61K 31/155 514/635 |
| 2019/0254983 A1* | 8/2019 | Curic ................ A61K 47/6933 |
| 2020/0140628 A1 | 5/2020 | Perez-Mercader et al. |
| 2022/0168234 A1* | 6/2022 | Bao ..................... A61K 9/0019 |
| 2024/0091166 A1 | 3/2024 | Gomez et al. |

FOREIGN PATENT DOCUMENTS

| | | |
|---|---|---|
| WO | 01/05373 A1 | 1/2001 |
| WO | 02/072254 A2 | 9/2002 |
| WO | 02/072254 A3 | 9/2002 |
| WO | 2013/059922 A1 | 5/2013 |
| WO | 2017/103268 A1 | 6/2017 |
| WO | 2021/224205 A1 | 11/2021 |
| WO | 2022/194615 A1 | 9/2022 |
| WO | 2024/175455 A1 | 8/2024 |
| WO | 2024/175457 A1 | 8/2024 |

OTHER PUBLICATIONS

European Search Report received for European Patent Application No. 22194645.2, mailed on Feb. 27, 2023, 8 pages.
International Search Report received for PCT Application No. PCT/EP2023/074026, mailed on Dec. 6, 2023, 5 pages.
Written Opinion received for PCT Application No. PCT/EP2023/074026, mailed on Dec. 6, 2023, 8 pages.

* cited by examiner (prior art)

NANOCARRIER MANUFACTURING

CROSS-REFERENCE TO RELATED APPLICATIONS

This application is a National Stage entry under § 371 of International Application No. PCT/EP2023/074026, filed on Sep. 1, 2023, and which claims the benefit of priority to European Application No. 22194645.2, filed on Sep. 8, 2022.

BACKGROUND

Field

In the context of the present invention a nanocarrier is a composition for carrying pharmaceutical, cosmetic or nutraceutical active ingredients. The nanocarrier may consist of a pure substance or may be a mixture of two or more substances. The substances may be solid, semi-fluid or liquid. The substances may be single-phase or multi-phase substances: In all cases nanocarriers are in particulate form, wherein the average particle size is smaller than 300 nm.

Description of Art

Examples of nanocarriers are particles of natural or synthetic polymers, lipids (lipid nanoparticles-LNP), liposomes and micelles and nanoemulsions.

Nanocarriers composed of two or more substances are generally produced by providing the individual substances or precursors thereof as dispersions or as solutions in liquid media and mixing these with one another. The mixing results in physical interactions between the individual substances or precursors to form the nanocarrier. The nanocarrier may optionally be subjected to subsequent workup, for example by separation from the liquid medium. The obtained nanocarrier may then either be used as a placebo or is laden with an active ingredient to form a nanoformulation.

In the context of the present invention a nanoformulation is a dosage form of a pharmaceutical, cosmetic or nutraceutical active ingredient carried by a nanocarrier. The active ingredient may be on the surface of the nanocarrier, may be inside the nanocarrier or may be complexed with the nanocarrier.

Examples of nanoformulations include inter alia so-called lipoplexes or polyplexes, i.e., complexes of polymers or lipids with for example DNA, RNA, proteins, peptides etc. Within these complexes the polymers/lipids form the nanocarrier while the DNA/RNA form the active ingredient.

As described above the production of nanoformulations may be carried out by loading a nanocarrier with active ingredient.

However, in pharmaceutical technology it is in the interest of process economy that the production of the nanocarrier and the loading thereof with active ingredient is carried out in an integrated process:

In such an integrated process the nanocarrier is produced first and loaded with active ingredient in the nascent state. This is generally carried out by providing and mixing the individual components of the nanoformulation as a dispersion or solution in liquid media. The components include the substances forming the nanocarrier/precursors to these substances and also the active ingredient or its precursors. The mixing results in physical interactions between the individual components to form the nanoformulation. If required, the nanoformulation is subsequently subjected to further workup, for instance removal of organic solvents or separation of the nanoformulation from the liquid medium. Especially nanoformulations using LNP or polyplexes as carrier are always produced in an integrated process where the loading of the carrier with active ingredient is carried out in the nascent state.

In commercial processes, loading of the nanocarrier is often realized by impingement mixers.

EP1519714B1 discloses a process for producing nanoformulations employing an apparatus comprising a T-shaped impingement mixer. The two fluids to be mixed are passed through coaxial feed conduits to a collision point, mixed there and withdrawn through a discharge offset by 90°. The volume flow of the two fluids into the active element is the same.

Beyond that, there are processes known that make use of so-called microfluidic mixers. Microfluidic mixers are usually static mixers working without any moving organs. The mixture is rather prepared by impingement (T- or Y-angle) or dividing and recombining streamlines of the components by a multitude of baffles or intersections. Microfluidic mixers have been developed for small scale chemical processes and are therefore operated at a very low throughput.

An introduction to microfluidic mixers and their production by means of additive manufacturing is provided by Enders et al:

Enders, A., Siller, I. G., Urmann, K., Hoffmann, M. R., Bahnemann, J.: 3D Printed Microfluidic Mixers—A Comparative Study on Mixing Unit Performances. Small 2019, 15, 1804326. DOI 10.1002/smil.201804326

From patent literature there are some items derivable disclosing the use of microfluidic mixers for preparing nanocarriers:

For instance, EP 3271057 B1 discloses the use of static mixers in liposome production.

U.S. Pat. No. 7,811,603 B2 discloses the microfluidic preparation of liposomes on a droplet basis.

WO 0105373 A1 discloses static mixer for mixing two liquids in NLP production. In particular, static mixer is used for mixing the buffer phase (e.g., RNA in buffer) but not for the particle formation during mixing the buffer phase and the organic lipid phase.

A distinctive kind of arrangement of micromixers named "herringbone" is known in LNP production from WO 2013059922 A1.

A certain type of micromixer named "caterpillar mixer" is known to be employed in liposome production from WO 2017103268 A1.

Liposome production with microfluidic device having a baffle is disclosed in WO 2021224205 A1. WO 2022/194615 A1 relates to an apparatus for preparing nanoformulations and/or microformulations from up to three liquid phases. The apparatus is equipped with three linear ducts, all arranged vertically. The third duct is surrounding the first and the second duct. The third duct is part of a liquid cycle. No micromixer is used.

A drawback of known processes for producing nanoformulations and/or nanocarriers (in particular lipid nanoparticles formed with the use of cationic or ionizable lipids) employing microfluidic mixers is that particles are not stabilized after mixing in acidic conditions and e.g. tend to agglomerate right after the microfluidic mixing process. In particular, it has been observed in field of LNP production, that a delay of subsequent change in acidity to a more neutral pH of the dispersion medium causes deformation of the LNP, thus a transport and prolonged storage of an intermediate is currently not possible. Thus, particle morphology and homogeneity are less stable. Further, residual solvent concentration in the product before downstream processing may be a reason for instability after production. Particle deformation leads to loss of active ingredient. This results in poor encapsulation efficiency.

BRIEF SUMMARY

In light of this, it is object of present invention to prepare nanocarriers/nanoformulations that shall have an improved stability in regard to particle morphology and homogeneity. Encapsulation efficiency shall be improved. Beyond that, the obtained nanocarriers shall not agglomerate to larger particles.

The objective is achieved by an apparatus according to the description herein and by a process according to the description herein performable using this apparatus.

The present invention thus provides an apparatus for producing nanocarriers and/or nanoformulations which has the following features:
- a) a static mixer having a contacting section and downstream of contacting section for providing an at least biphasic primary mixture, meaning mixing a first liquid phase with a second liquid phase in absence of a third phase;
- b) a linear pipe, whereby at least the distal section of the static mixer is surrounded by the linear pipe;
- c) a longitudinal mixing section, whereby the static mixer and linear pipe establish a longitudinal mixing section, which extends downstream from the static mixer inside the linear pipe up to its end;
- d) a first inlet of the static mixer for accommodating a first liquid phase from a first reservoir vessel via a first feed;
- b) a second inlet of the static mixer for accommodating a second liquid phase from reservoir vessel via a second feed;
- d) an inlet for a third feed of the linear pipe for accommodating a third liquid phase to the longitudinal mixing section from a third reservoir vessel via the third feed;
- e) a linear pipe forming at least a part of said third feed and said longitudinal mixing section;
- d) whereby the first inlet and second inlet are in fluid communication with the contacting section, the contacting section is receiving the first liquid phase and the second liquid phase in absence of the third phase, and whereby the static mixer is providing an at least biphasic primary mixture by mixing the first liquid phase with the second liquid phase in absence of the third phase
- g) the longitudinal mixing section is providing an at least triphasic secondary mixture by mixing said primary mixture with said third liquid phase;
- i) a collection vessel for accommodating the secondary mixture;
- k) a conduct, by means of which the longitudinal mixing section is in fluid communication with the collection vessel;
- l) whereby at least a distal section of said the static mixer is arranged inside said linear pipe, whereby the static mixer having a conical contacting section.

BRIEF DESCRIPTION OF THE SEVERAL VIEWS OF THE DRAWINGS

FIG. 0: shows the basic principle of inventive process and the setup of related apparatus my means of a simplified concept drawing;

DETAILED DESCRIPTION

Figure 1:
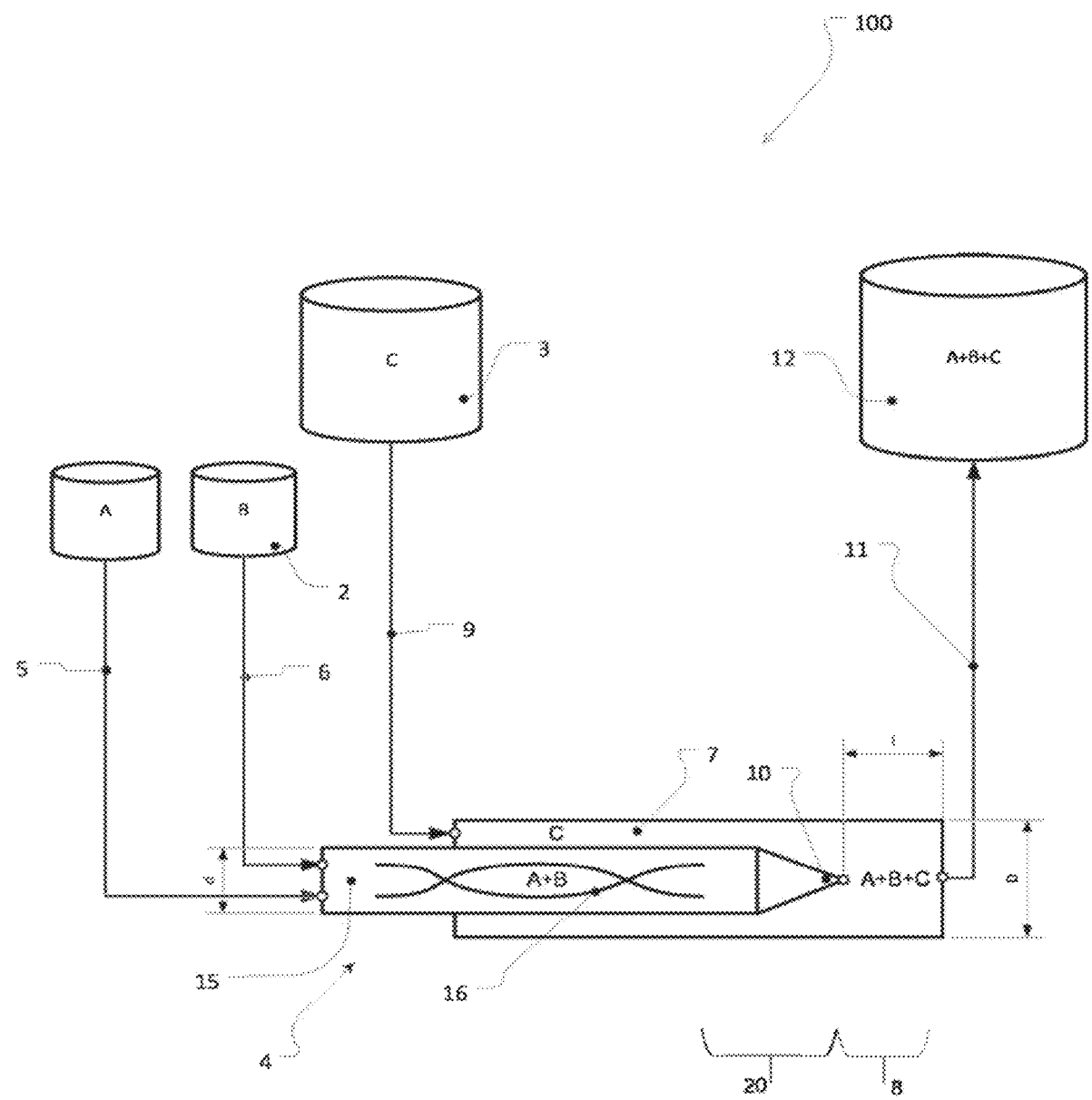
FIG. 1: detailed drawing of a first embodiment of static mixer.

The distal section shall mean the part closer to the output side of the static mixer.

An beneficial aspect of present apparatus is the arrangement of the static mixer inside the linear pipe (7) of the third feed to establish the longitudinal mixing section. Thanks to this arrangement, the first liquid phase A and the second liquid phase B are mixed first to give the primary mixture A+B. The static mixer is designed to mix A and B in absence of C. Thus, there is no inlet for the third liquid phase C into the static mixer. On the other hand, the static mixer is situated at least partly in the feed of the third phase C, namely in its linear pipe. Thus, the primary mixture A+B exiting the static mixer is instantaneously diluted with C flowing through the third feed line to give secondary mixture A+B+C.

According this invention, static mixer is equipped with a conical contacting section (15). Inside said contacting section, first liquid phase A and second liquid phase B are contacted for establishing primary mixture A+B. Due to conical shape of contacting section, contact angle is impressed to cone angle.

According to a preferred embodiment conical contacting section is equipped with a restrictor. The diameter of the restrictor shall be in range between 0.1 mm and 3 mm, preferable between 0.2 and 1.5 mm. A mixer with up to 1 mm restrictor seems to provide best particle stability.

Preferably, linear pipe and static mixer are arranged vertically. Thus, dilution of primary mixture A+B in third phase is not influenced by gravity.

It has been found that particle stability can be improved by means of a helically twisted channel having e.g., a rectangular cross section and/or a staggered arrangement of static mixing elements. Primary mixture A+B flows through this distinctively designed channel to intimate contact of components of later nano particles or nanoformulations.

According to a preferred embodiment apparatus is characterized by two inlet ducts arranged in parallel inside of the static mixer (4) and preferably one aperture projecting into direction of central axis of linear pipe. Each inlet duct is dedicated to one liquid phase. After leaving inlet ducts, mixing of first and second liquid phase to primary mixture is performed. As inlet ducts are arranged in parallel, contact angle of first liquid phase A and second liquid phase B is 0°.

According to yet another preferred embodiment, static mixer is equipped with a pinhole aperture projecting into direction of central axis of linear pipe, wherein pinhole aperture marks the most-narrow constriction of the mixer. The diameter of pinhole aperture amounts from 0.1 to 1 mm. As most-narrow constrictions of usual microfluidic devices is below 0.1 mm, static mixer is not considered as a microfluidic device. Having a most-narrow constriction in range from 0.1 to 1 mm, it is rather considered as a millifluidic device.

Mentioned design elements of static mixer are to be arranged in the following sequence in downstream direction: pair of parallel inlet ducts, conical contact section with restrictor, helically twisted channel having a rectangular cross section and/or a staggered arrangement of static mixing elements, pinhole aperture.

According to a preferred embodiment of the apparatus, the static mixer comprises a dwelling section for the primary mixture A+B, preferably a dwelling section formed as a capillary having a length of minimum double the length of the contact section and/or the helically twisted channel, preferably 2 to 25 times in length of the contacting section, ideally 10 to 25 times in length. According to a further opinion the dwelling section is even party formed as a helix. The outlet of the dwelling section is placed inside the linear pipe and/or forms at least one of the feeds of the linear pipe. According to an improved embodiment, a aperture plate is placed between the contact section and the subsequent dwelling zone formed as a capillary and/or a helically twisted channel. Adventurously the aperture of the aperture plate has an open diameter of 0.8 to 5 mm, ideally 0.8 to 2.5 mm.

Preferably the extended dwelling section comprises no inner mixing element. The primary mixture A+B flows continuously, preferably having at least for a defined distance a laminar flow inside the in extended dwelling section, ideally having at least for more than ⅔ of the length a laminar flow inside the extended dwelling section.

According to a preferred embodiment of the overall apparatus, collection vessel for accommodating the secondary mixture and third reservoir vessel for accommodating a third liquid phase are designed as a combined vessel, such as combined vessel, third feed, longitudinal mixing section and conduct forming a circle line. Such circle line helps running production process continuously.

Circle line may require circulating pump for circulating secondary mixture.

Inventive apparatus may be equipped with at least one of the following:
i) first feed including a metering device for dosing first liquid phase into static mixer;
ii) second feed including a metering device for dosing second liquid phase into static mixer;
iii) third feed including a metering device for dosing third liquid phase into longitudinal mixing section.

The metering devices are used to control the quantity of each liquid phase for realizing desired shares in the mixtures.

It has been observed that dosing primary mixture A+B directly into third liquid C without further mixing means allows production of nanoparticles that are stabilized e.g. do no tend to agglomerate. Thus, the particle size distribution of obtained nanocarriers is constant over time.

For achieving this effect at its best, choosing a volume flow of the third liquid C that is larger than the volume flow of the primary mixture A+B is recommended.

Such optimized usage of inventive apparatus for providing nanoformulations or nanocarriers is a second object of the inventive.

Hence, yet another object of the invention is a process for producing a nanocarrier and/or a nanoformulation, comprising the steps of:
a) providing an inventive apparatus as outlined above;
b) providing a first liquid phase in the first reservoir vessel, wherein the first liquid phase comprises a first liquid dispersion medium and at least one component selected from the group consisting of precursor to a nanocarrier, active ingredient, precursor to an active ingredient;
c) providing a second liquid phase in the second reservoir vessel, wherein the second liquid phase comprises a second liquid dispersion medium and at least one component selected from the group consisting of precursor to a nanocarrier, precursor to an active ingredient, active ingredient;
d) providing a third liquid phase in the third reservoir vessel, wherein the third liquid phase comprises a third liquid dispersion medium;
e) establishing a first liquid flow from the first reservoir vessel via the first feed into the static mixer;
f) establishing a second liquid flow from the second reservoir vessel via the second feed into the static mixer;
g) establishing a third liquid flow from the third reservoir vessel via the third feed into the longitudinal mixing section, wherein the volume flow of the third liquid flow is larger than the sum of the volume flow of the first liquid flow and the volume flow of the second liquid flow;
h) mixing the first liquid phase and the second liquid phase in the static mixer in absence of the third phase so as to obtain an at least biphasic mixture containing the nanocarrier and/or a nanoformulation or precursors thereof;
i) mixing the biphasic mixture with the third liquid phase by means of the longitudinal mixing section so as to obtain an at least triphasic mixture containing the nanocarrier and/or nanoformulation and third liquid dispersion medium;
k) conducting triphasic mixture from longitudinal mixing section to collection vessel by means of the conduct;
l) collecting the triphasic mixture in the collection vessel;
m) withdrawing the triphasic mixture from the apparatus;
n) optionally: working up the triphasic mixture, in particular separating the nanocarrier and/or the nanoformulation from the triphasic mixture.

Substantial aspect of the inventive process is that the volume flow of the third liquid phase is larger than the sum of the volume flow of first liquid phase and second liquid phase. This sum is equal to the volume flow of the primary mixture.

Dispersing the primary, biphasic mixture in the larger volume of third liquid leads to improved particle stability in terms of morphology and homogeneity. In addition to that, if an active ingredient is to be laden on the nanocarrier to give a nanoformulation, encapsulation efficiency is enhanced when using inventive device.

As the volumetric amount of the third phase is larger than the first and second phase, the third phase can be used to adjust the pH value of the secondary mixture.

According to a first option, the pH of the first liquid phase is between 3 and 5, preferably 4, whereas the pH of the third liquid phase is between 6 and 8, preferably 7. As the pH of the third (large) phase is higher than the first (small) phase, the pH is raised radically in the moment of contact of the primary mixture with the third liquid phase. This pH shift particularly stabilizes LNPs.

According to a second option, the pH of the first liquid phase is between 3 and 5, preferably 4, whereas the pH of the third liquid phase is between 3 and 5, preferably 4. Thus, pH of first liquid phase and third liquid phase is quite similar but not necessarily identical. Accordingly, there is no radical pH shift when providing the secondary mixture, the pH values is rather maintained. This option is chosen if a pH shift shall be performed in a subsequent downstream step. However, in view of production efficiency and particle stability, performing pH shift while mixing primary mixture with third liquid phase is preferred.

Given pH values are to be measured at 25° C. with a glass electrode. The latter shall be calibrated with a reference liquid of defined pH value. It is worth to mention that 25° C. is the temperature for defining the pH value only. The temperature at which the liquid phases are blended may be higher or lower.

According to a preferred embodiment of inventive process, second liquid phase comprises an organic dispersion medium. Thus, for second liquid phase no pH value can be defined. In that constellation, first and third dispersion media are selected to be water or an aqueous buffer for pH adjustment.

Examples of organic substances that might be used as dispersion medium are monohydric or polyhydric alcohols such as ethanol or glycerol.

These organic compounds do have a comparable high bio-compatibility (in case of ethanol residual solvent class III "Solvents with low toxic potential" according to "EMA Guideline Q3C (R8) on impurities: guideline for residual solvents") and are capable for dissolving precursors of LNP namely, lipids.

If LNPs are to be produced, artificial or natural lipids are preferred precursors of nanocarriers. A prominent example for a natural lipid suitable as a LNP precursor is cholesterol. Examples of artificial lipids usable for the same purpose are 1,2-dioleyloxy-3-dimethylaminopropane (DODMA), 1,2-Dimyristoyl-rac-glycero-3-methoxypolyoxyethylene (PEG-DMG), dilinoleylmethyl-4-dimethylam-inobutyrate (Dlin-MC3-DMA) and 1,2-Distearoyl-sn-glycero-3-phosphocholine (DSPC).

As set out above, if a pH shift is to be performed during preparation of nanocarriers or nanoformulations, this is preferably accomplished by means of third liquid phase defining the final pH of the secondary mixture. The pH of the third liquid phase is defined by selecting a suitable buffer in suitable amount. Examples of suitable buffers are phosphate buffer pH 7.4 USP, phosphate buffer saline (pH 7.4) and 2-(4-(2-hydroxyethyl)-1-piperazinyl) ethane sulfonic acid (HEPES buffer).

Preferred product of present process are lipid nanoparticles (LNP).

If an apparatus with a circulating line having or being fluidically connected to a combined vessel used as third reservoir vessel for accommodating a third liquid phase and as collecting vessel for collecting the secondary mixture, the process is to be run in a manner that the third liquid phase is circulated before or during a metered addition of the first liquid phase and the second liquid phase.

An alternative usage of inventive apparatus is characterized by using the third feed not for feeding the third liquid phase to the mixer but for feeding the secondary, biphasic mixture to the third vessel. Thus, the triphasic, secondary mixture is prepared in the third vessel and not in the mixing section. In this setup, third vessel can be considered as collection vessel.

Hence, a further subject matter of present invention is the use of apparatus as described herein in a process for producing a nanocarrier and/or a nanoformulation by mixing a first liquid phase and a second liquid phase in the static mixer in absence of a third phase so as to obtain an at least biphasic mixture containing a nanocarrier and/or a nanoformulation, whereby third feed is used for conducting biphasic mixture to the third accommodation vessel.

The process and apparatus according to the invention shall now be elucidated with reference to exemplary embodiments. To this end:

FIG. 1: shows the basic principle of inventive process and the setup of related apparatus my means of a simplified concept drawing.

Figure 2:
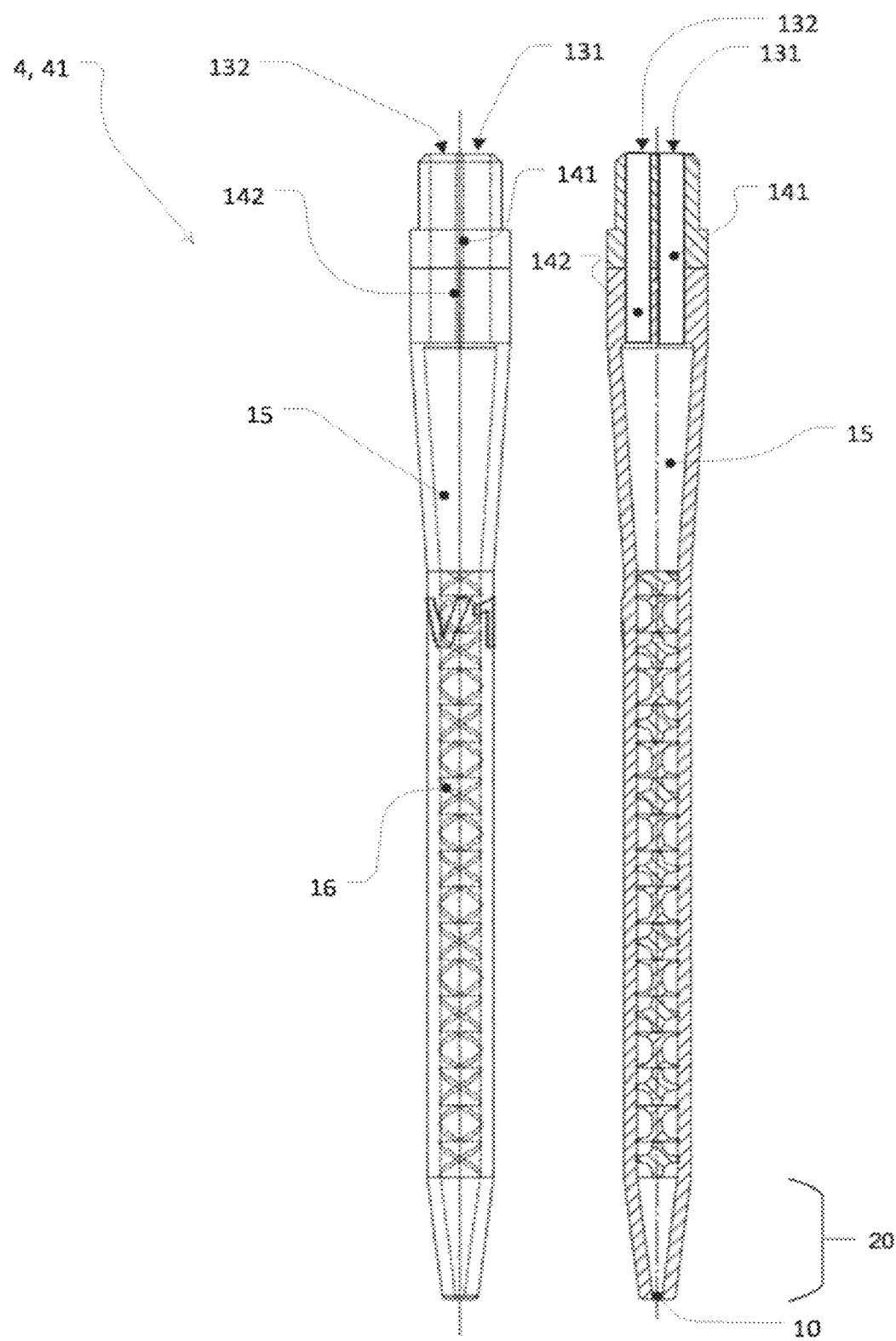
FIG. 2: detailed drawing of a second embodiment of static mixer.

FIG. 2: shows detailed drawing of a first embodiment of static mixer.

Figure 3:
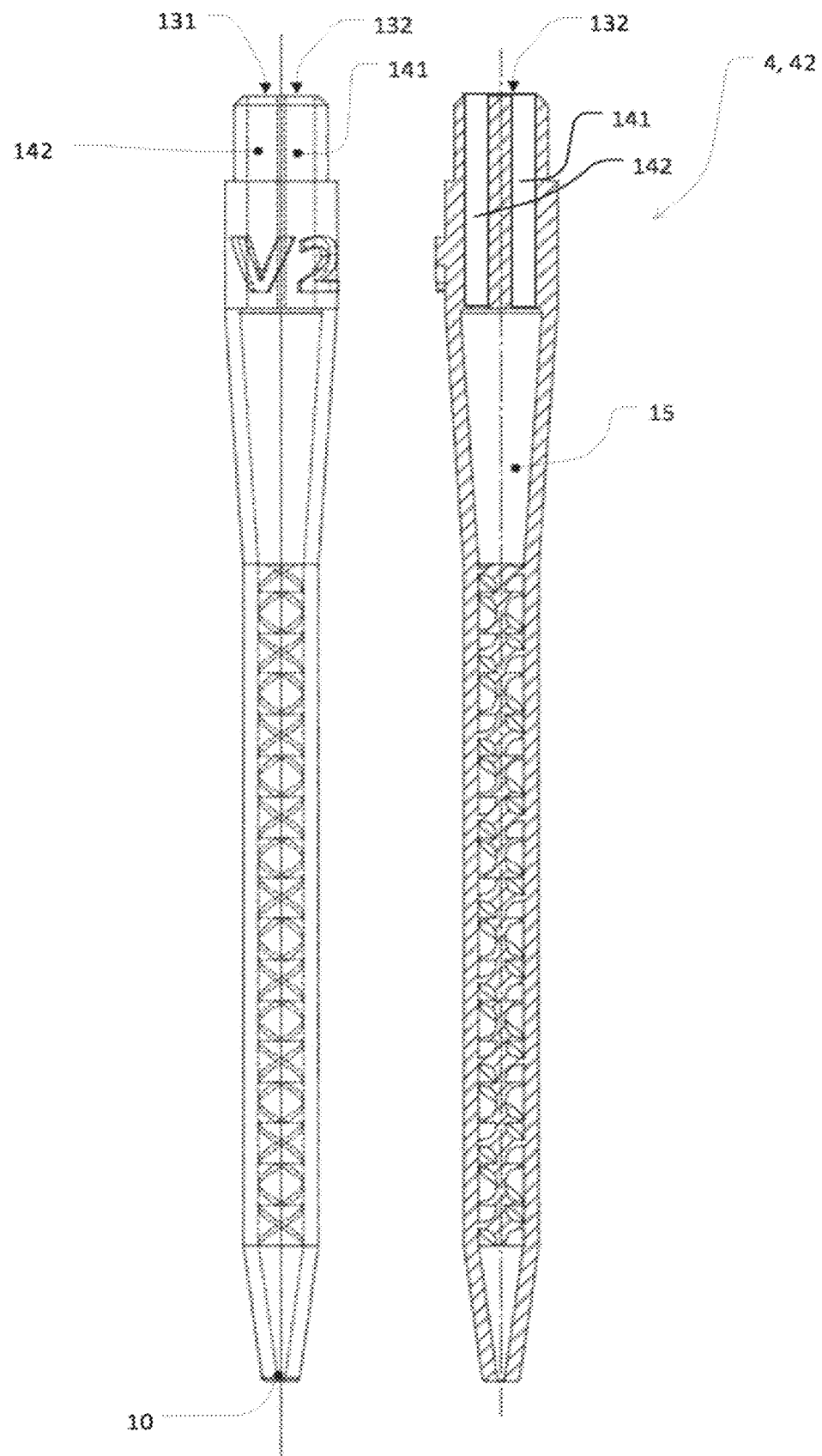
FIG. 3: detailed drawing of a third embodiment of static mixer.

FIG. 3: shows detailed drawing of a second embodiment of static mixer.

Figure 4:
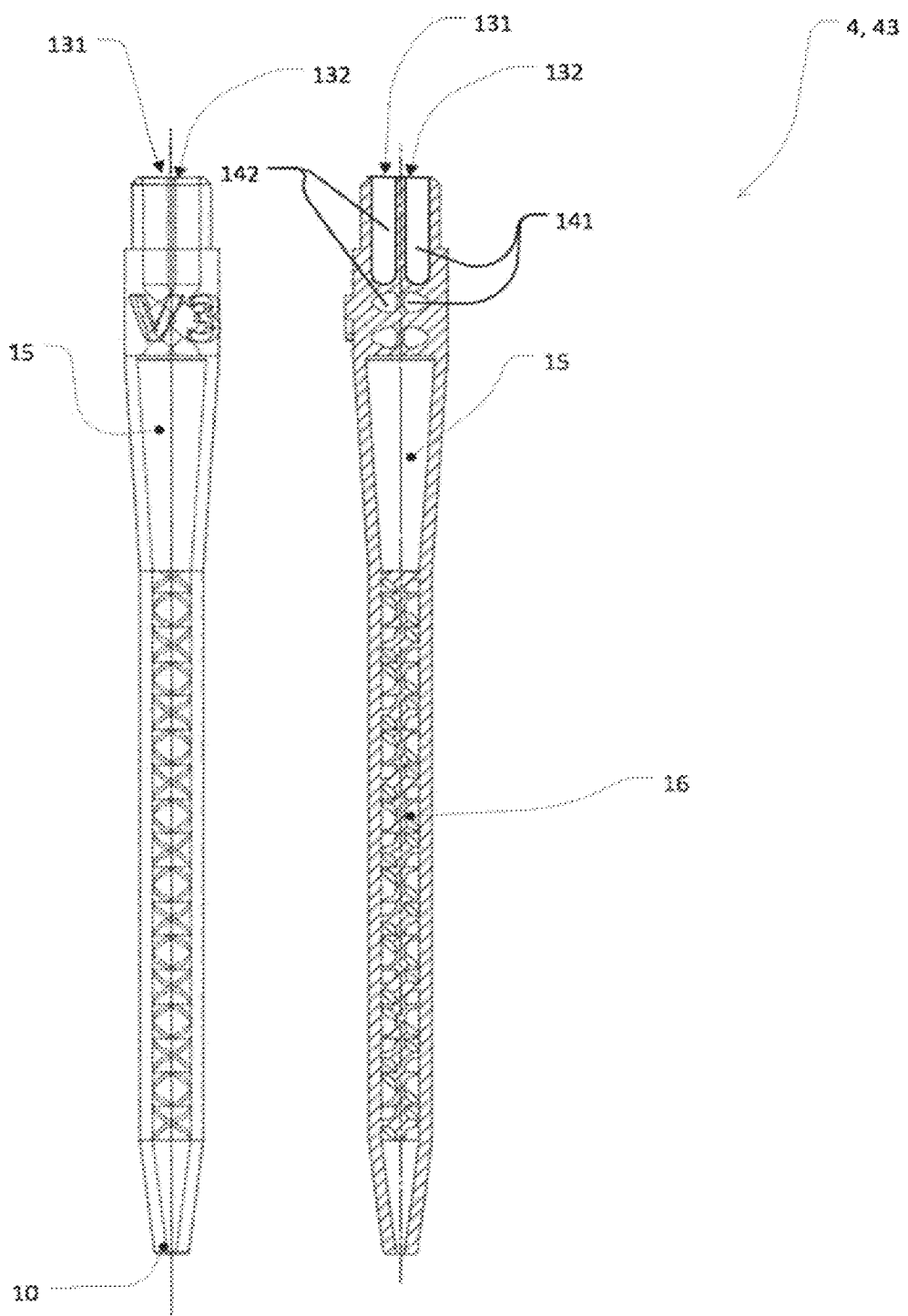
FIG. 4: detailed drawing of a fourth embodiment of static mixer.

FIG. 4: shows detailed drawing of a third embodiment of static mixer.

Figure 5:
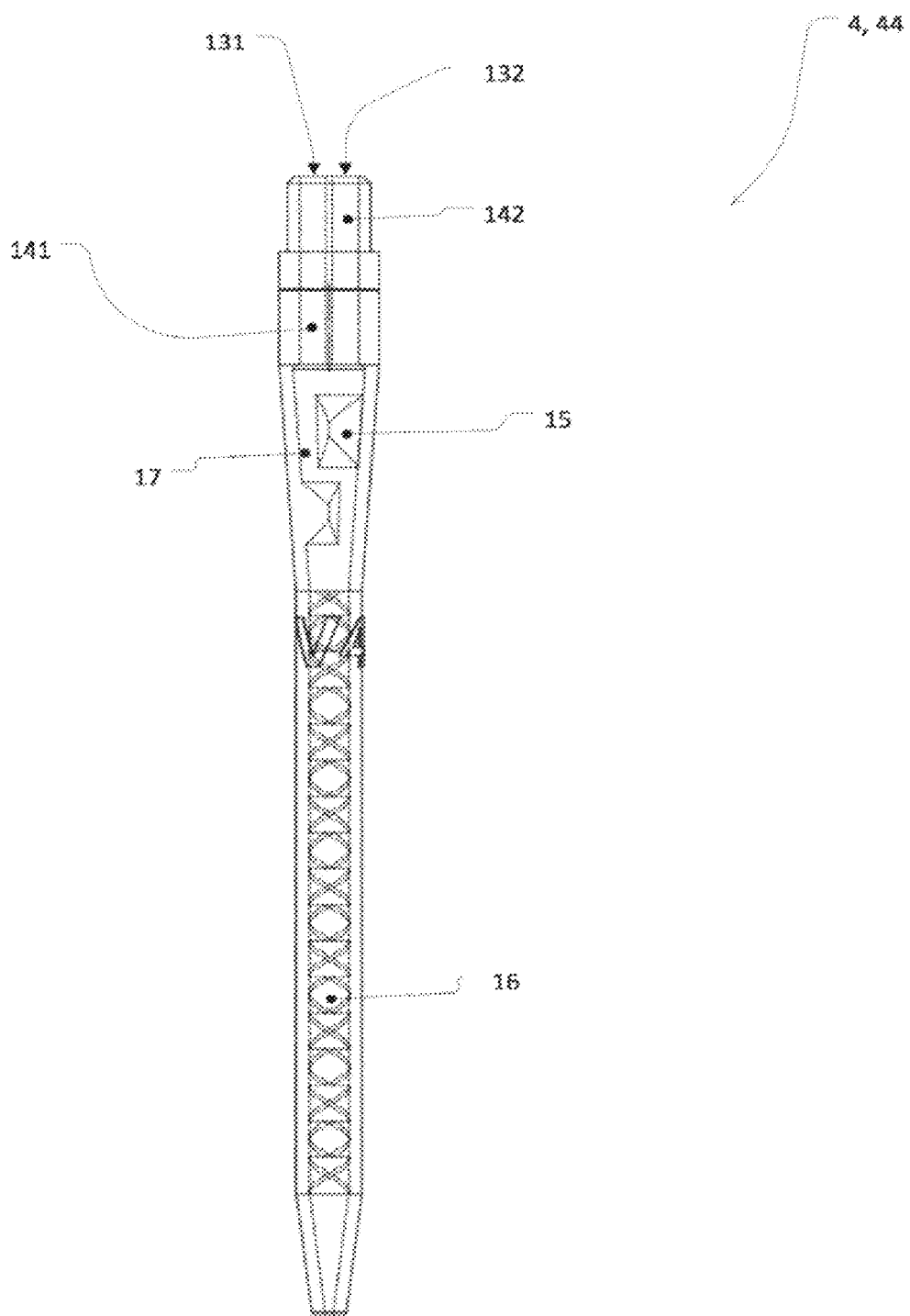
FIG. 5: detailed drawing of a fifth embodiment of static mixer.

FIG. 5: shows detailed drawing of a fourth embodiment of static mixer.

Figure 6:
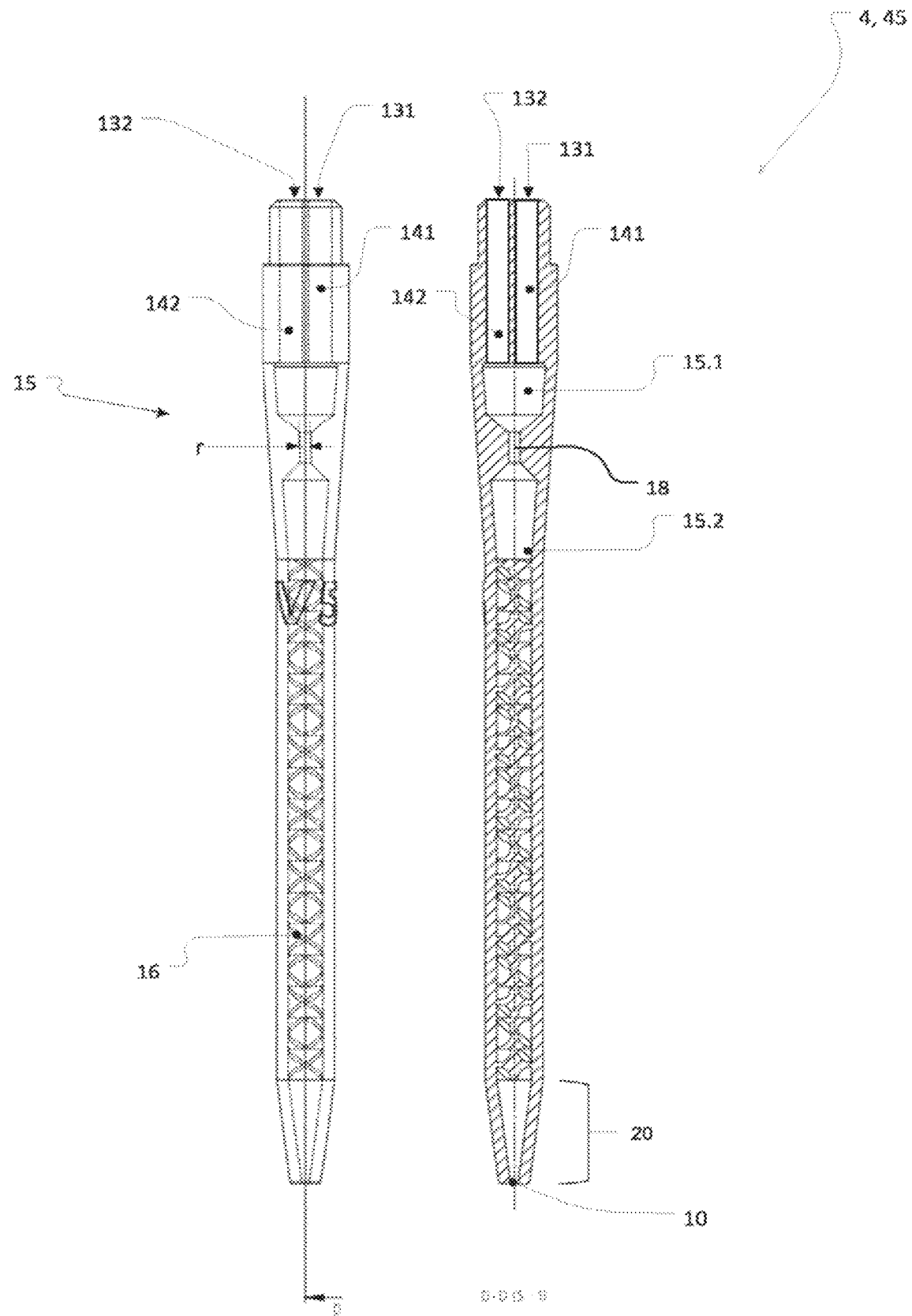
FIG. 6: detailed drawing of mixing path of all embodiments.

FIG. 6: shows detailed drawing of a fifth embodiment of static mixer.

Figure 7:
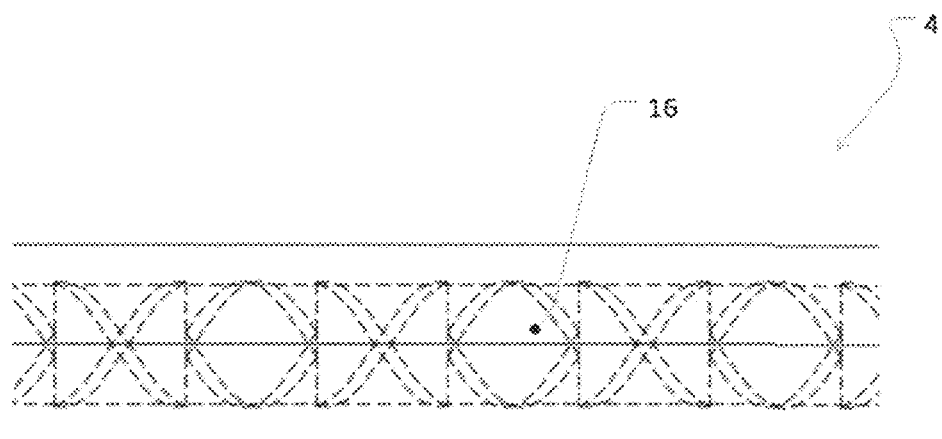
FIG. 7: shows modified setup of inventive process with closed cycle.
Figure 7:
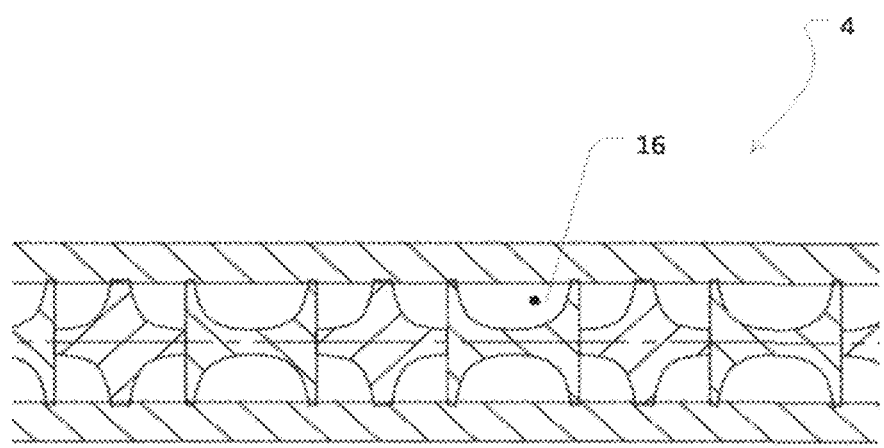
Figure 7:
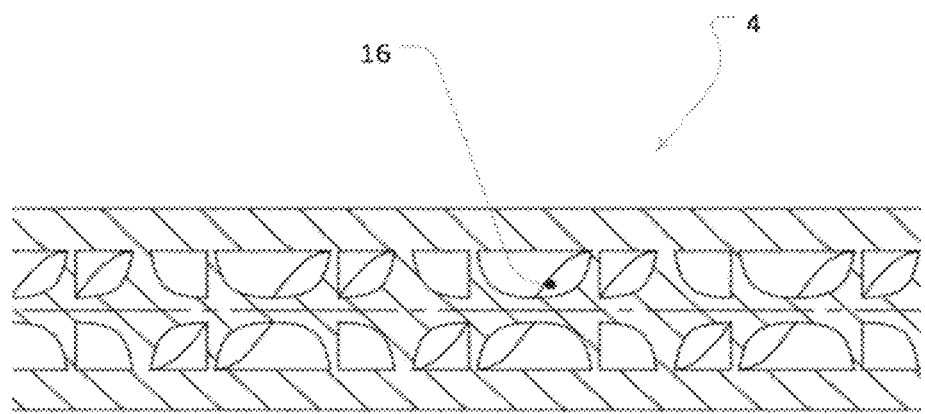

FIG. 7: shows detailed drawing of mixing path of all embodiments.

Figure 8:
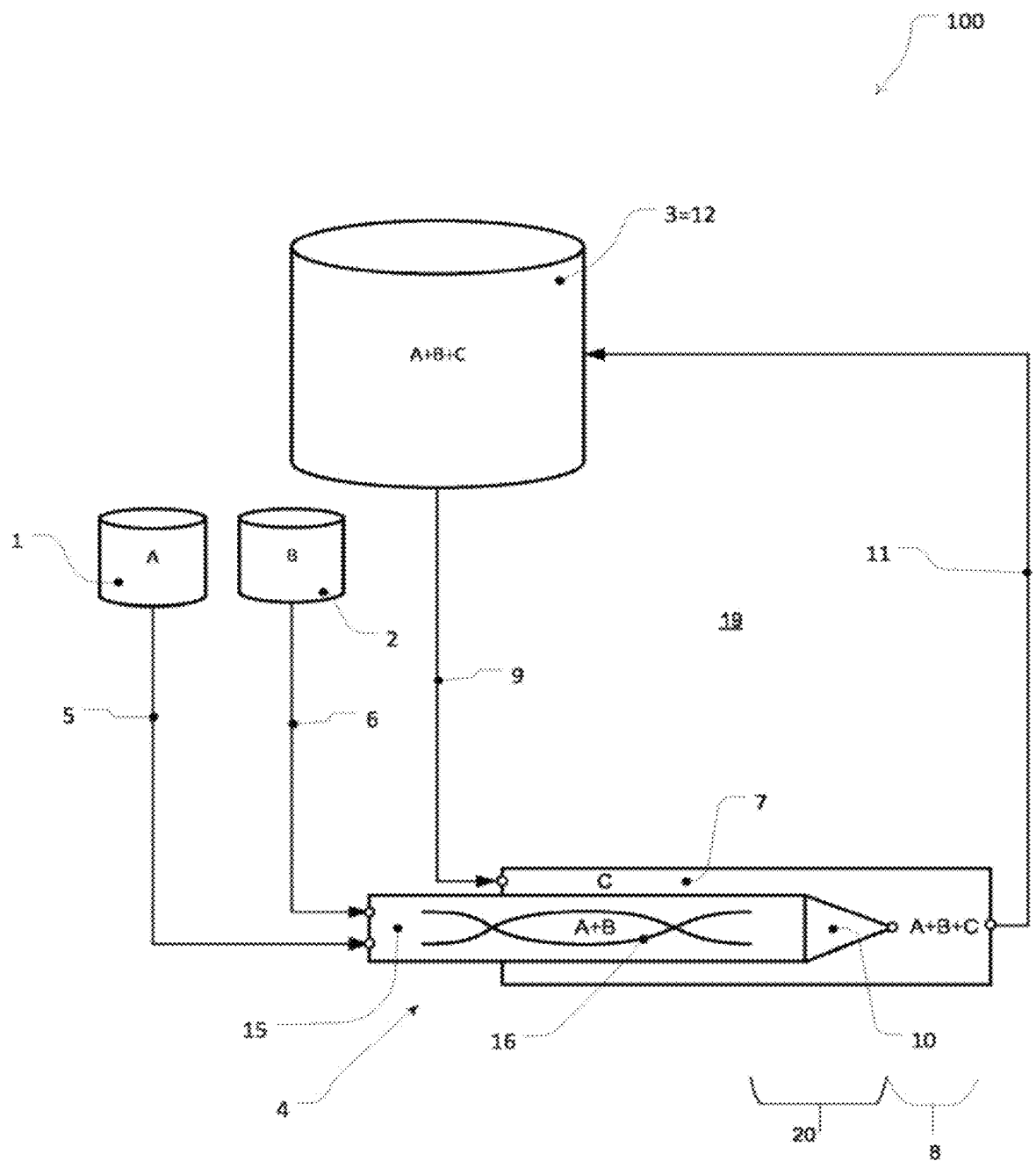
FIG. 8: shows alternative use of inventive setup.

FIG. 8: shows modified setup of inventive process with closed cycle.

Figure 9:
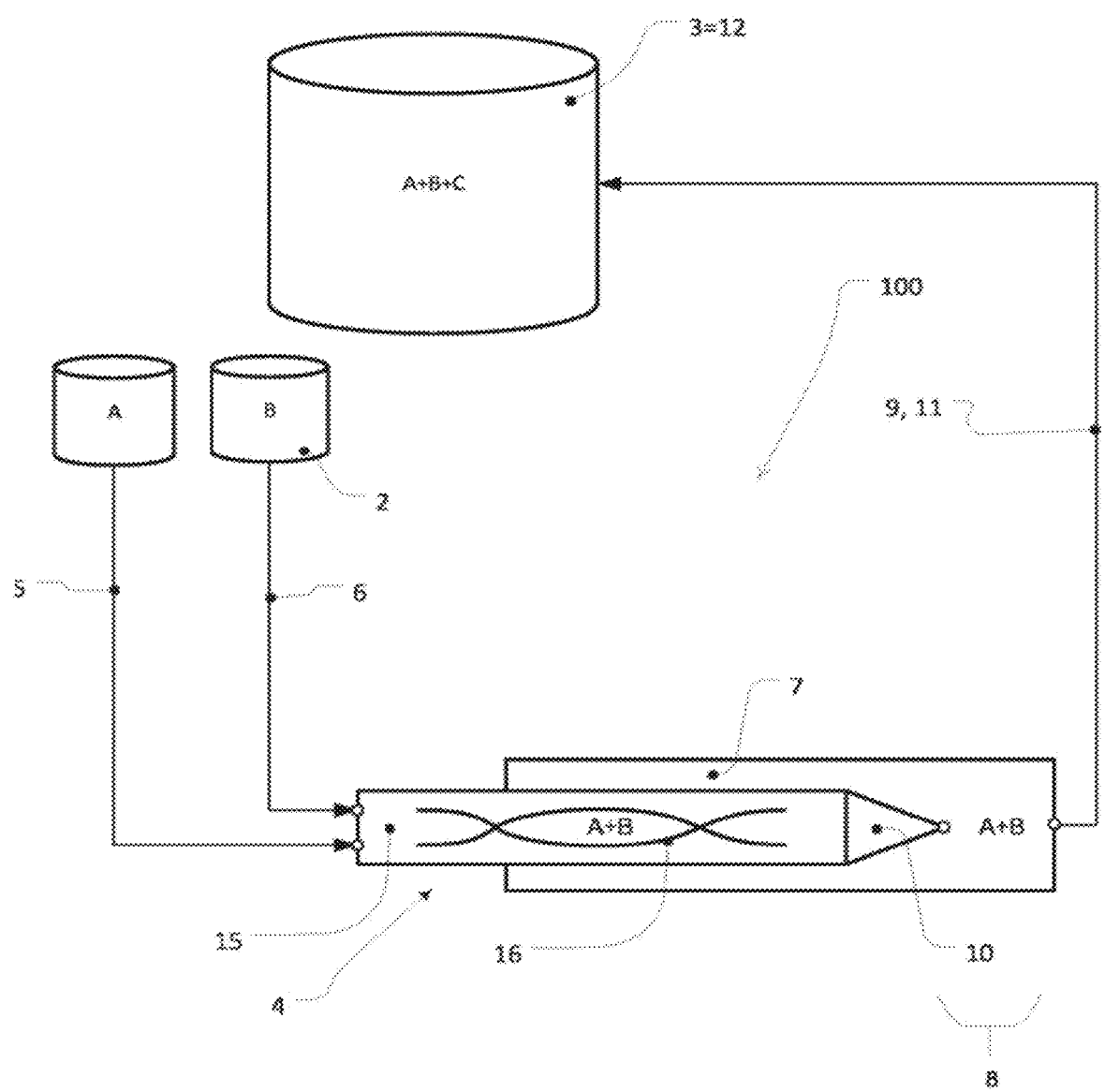
FIG. 9: results of Cryo-TEM analysis/Particles prepared without static mixer (prior art)

FIG. 9: shows alternative use of inventive setup.

Figure 10:
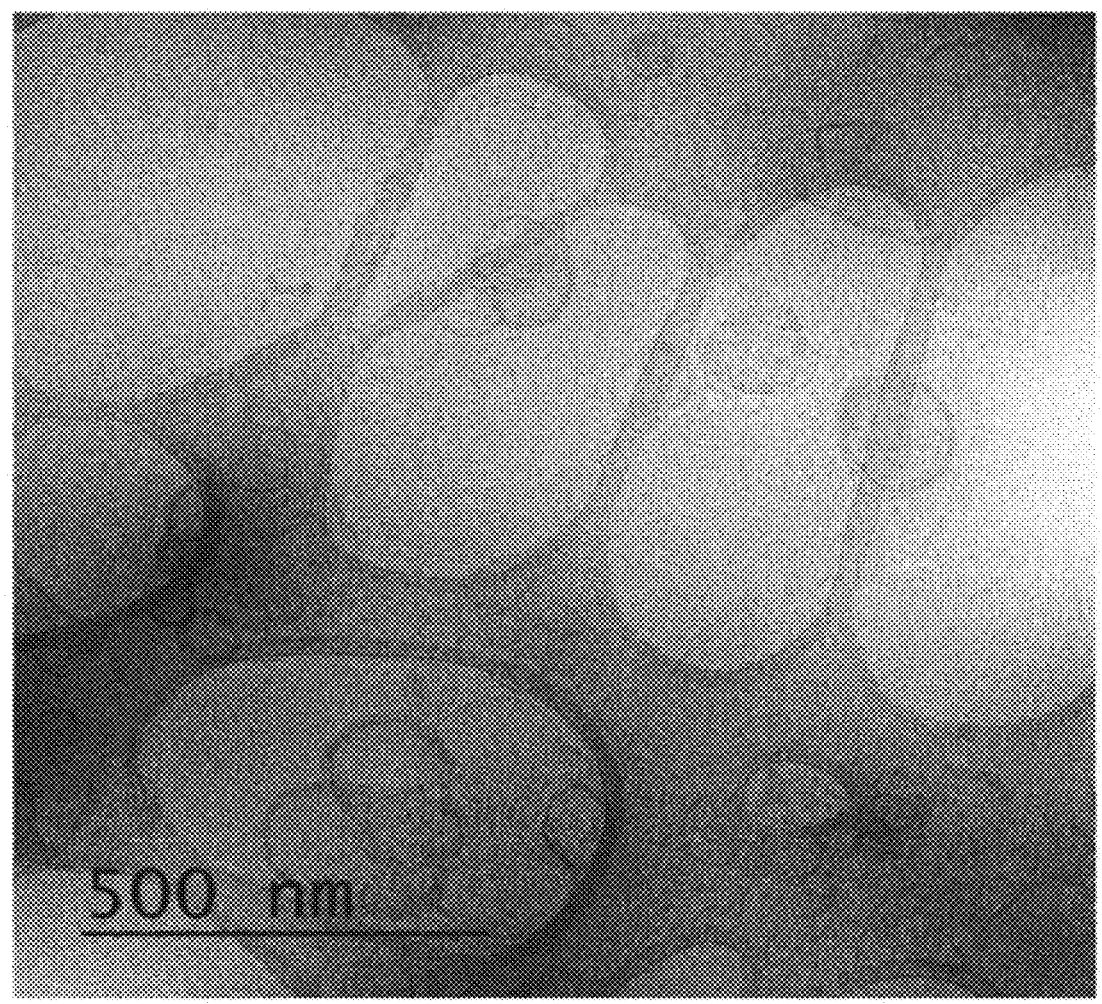
FIG. 10: results of Cryo-TEM analysis/Particles prepared with static mixer (inventive)

FIG. 10: shows results of Cryo-TEM analysis/Particles prepared without static mixer (prior art).

Figure 11:
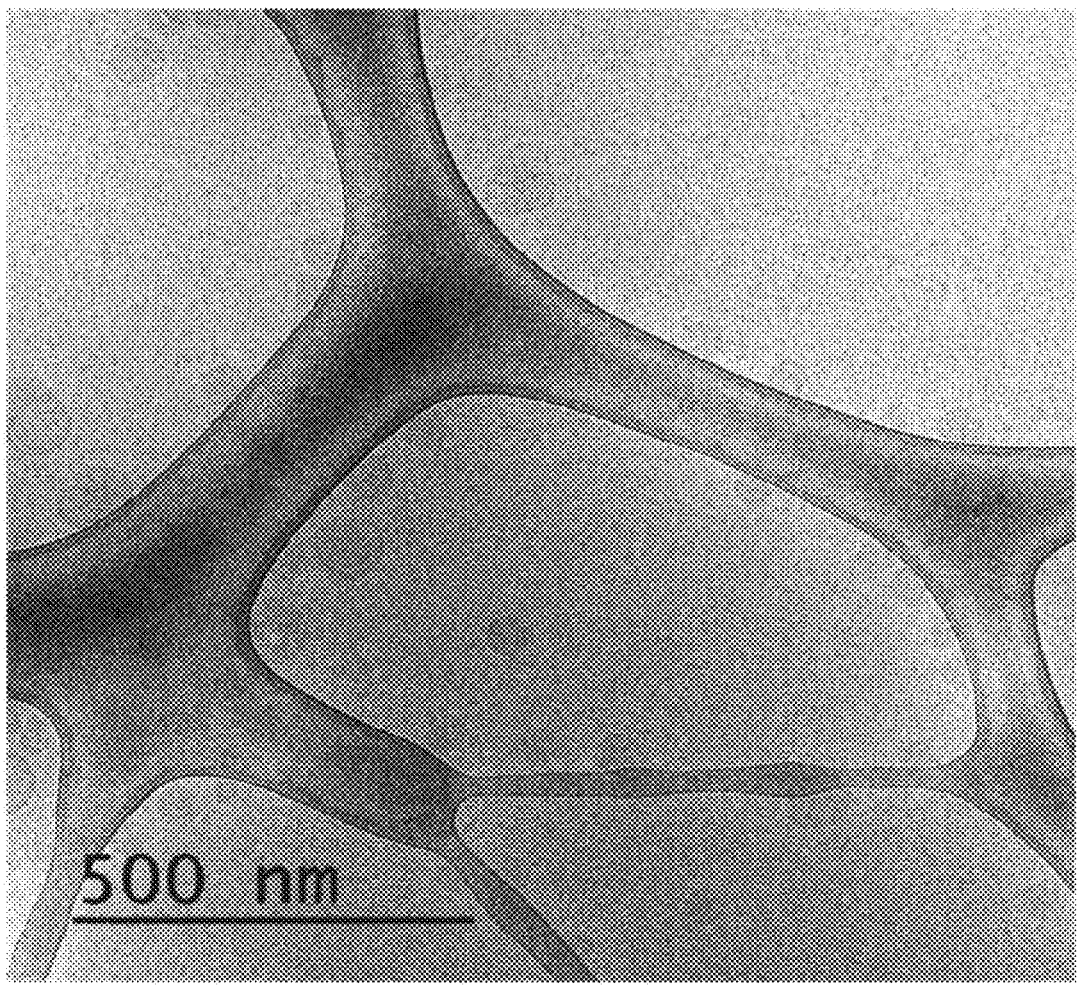
FIG. 11: results of Cryo-TEM analysis/Particles prepared with optimized static mixer setup.

FIG. 11: shows results of Cryo-TEM analysis/Particles prepared with static mixer (inventive).

Figure 12:
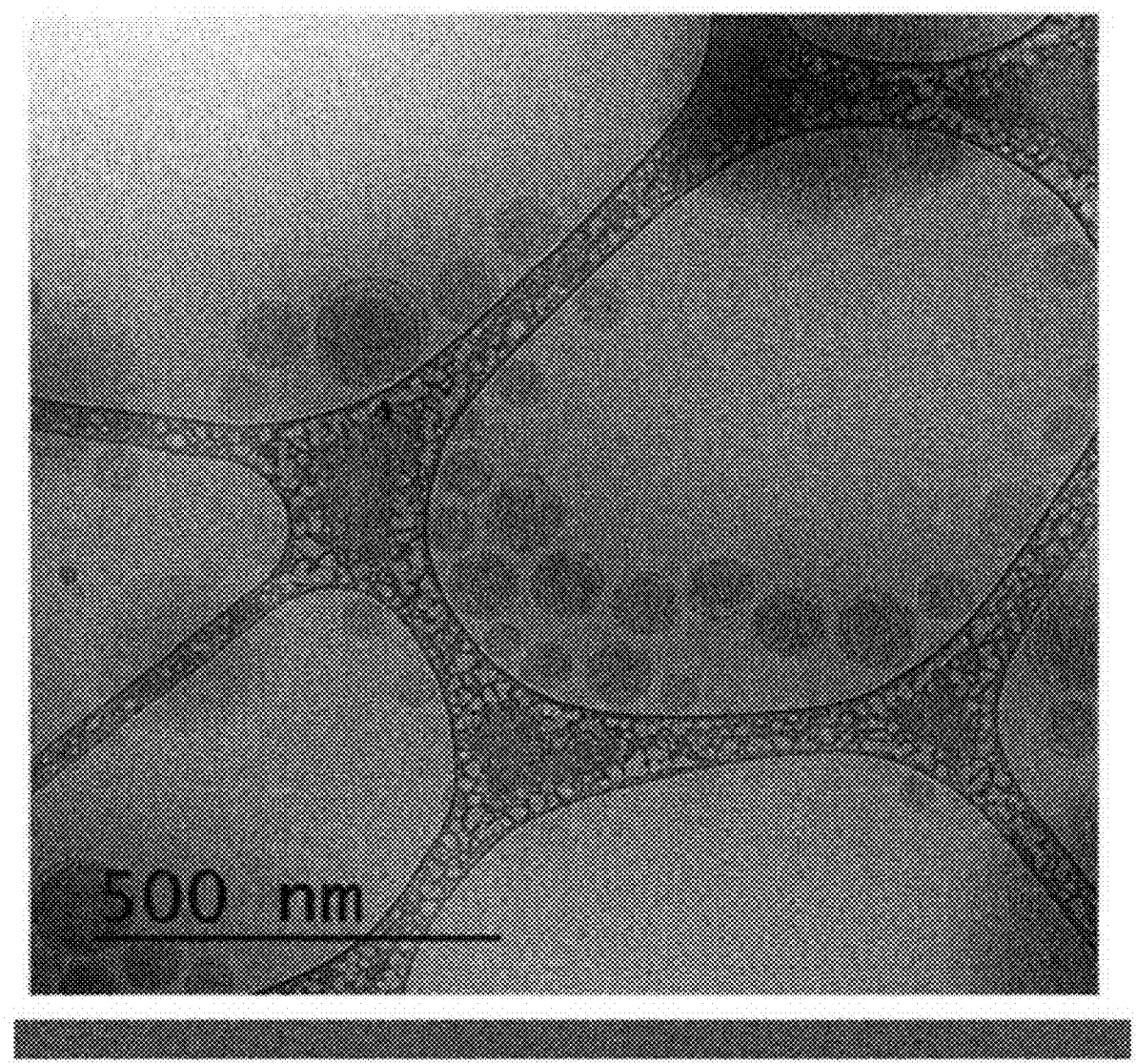
FIG. 12: shows another alternative use of inventive setup.

FIG. 12: shows results of Cryo-TEM analysis/Particles prepared with optimized static mixer setup.

Figure 13:
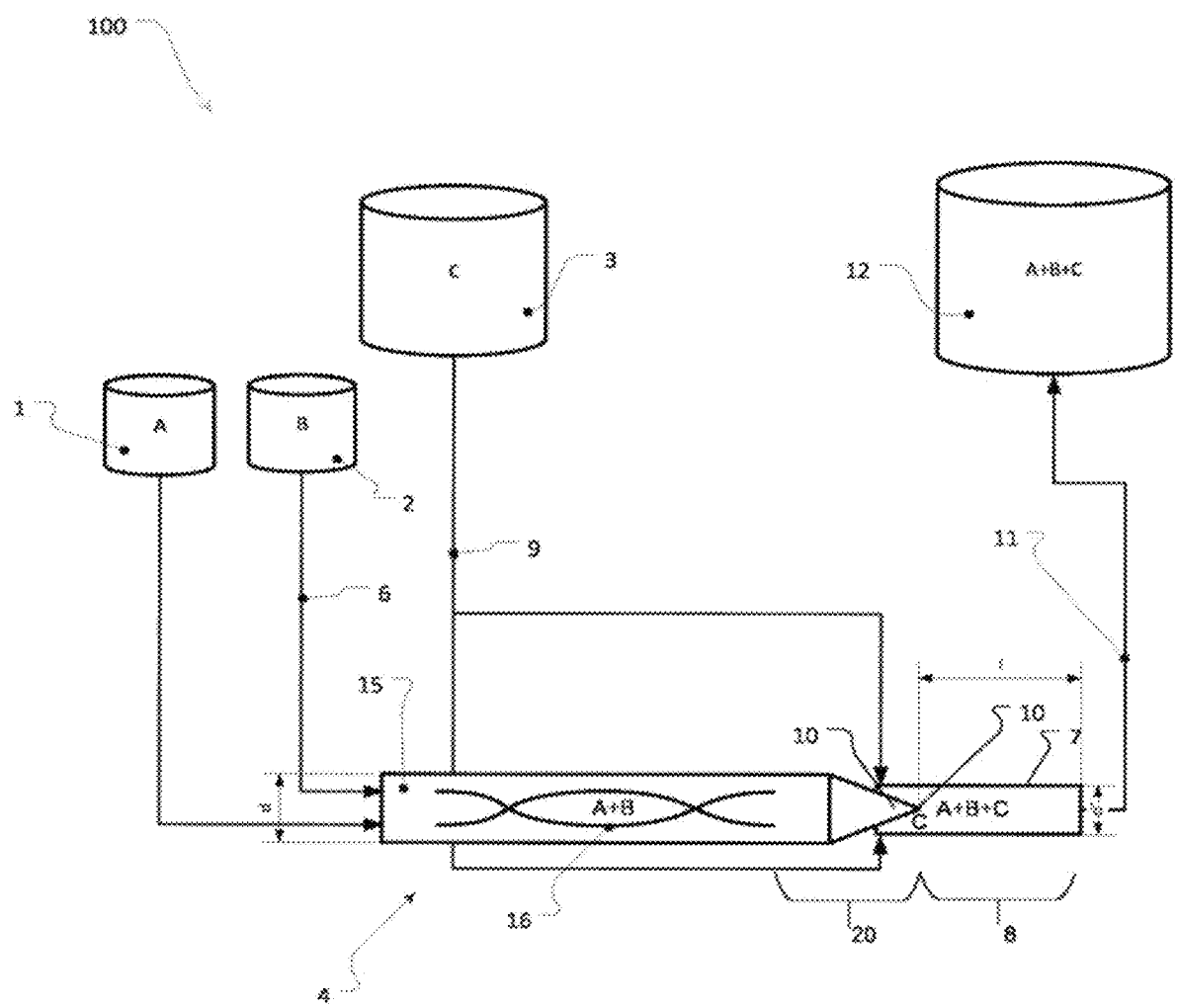
FIG. 13: detailed drawing of a sixth embodiment of static mixer.

FIG. 13: shows another alternative use of inventive setup.

Figure 14:
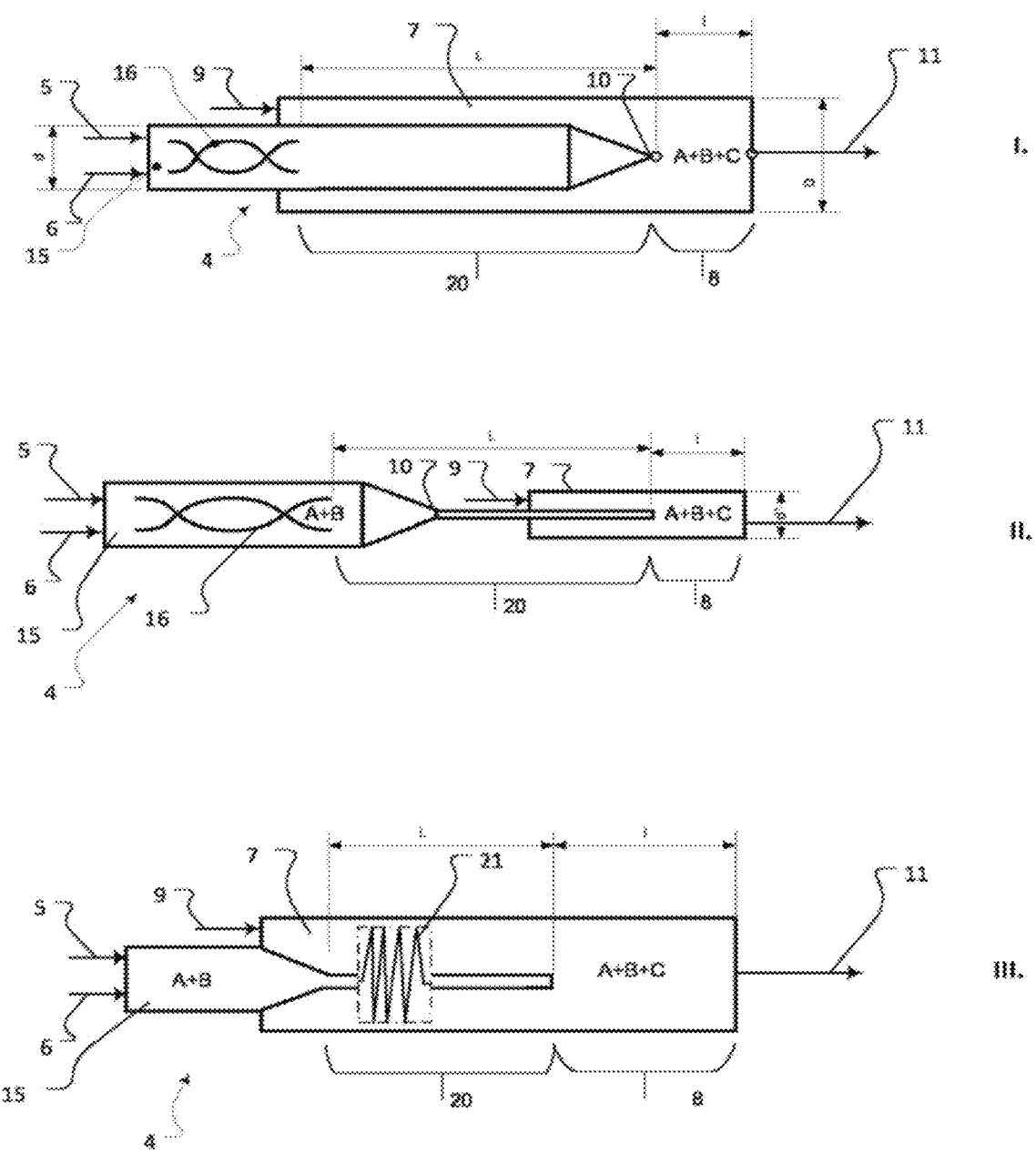

FIG. 14: detailed drawing of a sixth embodiment of static mixer.

A concept drawing of an inventive apparatus 100 and its integration into an inventive process for preparing nanocarriers and/or nanoformulations is provided in FIG. 1.

For preparing nanocarriers and/or nanoformulations, at least three liquid phases A, B and C are necessary. Each liquid phase A, B, C is provided in a separate reservoir vessel 1, 2 and 3. Each liquid phase comprise a liquid dispersion medium. The dispersion media may be different or similar. For example, first liquid dispersion may be water or an aqueous buffer, second liquid dispersion medium may be alcohol and third liquid dispersion medium may be water or an aqueous buffer. At least first liquid phase A and second liquid phase B further comprise at least one functional component that is dispersed in the respective dispersion medium. Said functional component may be a precursor to a nanocarrier, an active ingredient or a precursor to an active ingredient. In most cases, functional component of first liquid phase A differs from functional component of second liquid phase B. For example, first liquid phase may comprise an active ingredient, while second liquid phase may comprise nanocarrier precursors. Third liquid phase C does not necessarily comprise such functional components. It may be pure dispersion medium. However, it is preferred that third liquid phase C comprises a buffer. The amount of the sum of first and second liquid phase provided in reservoirs 1 and 2 is much smaller than the amount of third liquid phase provided in reservoir vessel 3.

Essential part of inventive apparatus 100 is a static mixer 4 arranged for mixing first liquid phase A with second liquid phase B to provide a biphasic primary mixture A+B. For this purpose, each of first and second vessels 1 and 2 are fluidically connected with static mixer 4 via a first feed 5 and a second feed 6 respectively. There is no fluidic connection between third reservoir vessel 3 and the static mixer 4. Hence, within static mixer 4 the first liquid phase 1 and second liquid phase 2 are mixed in absence of third liquid phase C.

Mixer is designed as a static mixer 4. This means that static mixer 4 does not comprise any moving organs. The static mixer 4 is rather equipped with fixed baffles provoking both liquid phases A and B blending intimately. Outer contour of static mixer is of substantially cylindrical shape.

The static mixer 4 comprises two inlets 131, 132, each for one liquid phase, two inlet ducts 141, 142 and at least one aperture 10. The aperture 10 is at the opposite end of the inlets 131, 132.

At least the distal section of the static mixer 4 is surrounded by a linear pipe 7 of cylindrical shape. This arrangement of static mixer 4 and linear pipe 7 establishes a longitudinal mixing section 8, which extends downstream from the mixer 4 inside the linear pipe 7 up to its end. Inlet of linear pipe 7 is connected via a third feed 9 with third reservoir vessel 3. Thus, third liquid phase C can be fed into linear pipe 7 via third feed 9. Linear pipe 7 and third feed 9 may be integrated in one part such that linear pipe 7 is an integral part of third feed 9 either.

The distal end of the static mixer 4 is designed as a pinhole aperture 10. Pinhole aperture 10 marks the exit of static mixer 4. Once the primary mixture A+B exits static mixer 4 it will be instantaneously diluted with third liquid phase C to provide a secondary mixture A+B+C. The secondary mixture A+B+C is prepared in the longitudinal mixing section 8 which extends from the pinhole aperture 10 of the static mixer 4 downstream through linear pipe 7. Upstream from longitudinal mixing section 8, third liquid phase C flows outside the mixer 4 through linear pipe 7. For that purpose, inner diameter D of linear pipe 7 is notably larger than outer diameter d of static mixer 4. The difference of D and d establishes an annular flow path for third liquid phase C.

The axial position of static mixer 4 inside of linear pipe 7 is variable. Hence, length/of longitudinal mixing section 8 may be modified. This allows adjustment of particle size distribution. The radial position of static mixer 4 inside the linear pipe 7 is fixed as well as its angle orientation. In particular, the radial position and angle is selected as to arrange static mixer 4 and linear pipe 7 concentrically.

The secondary mixture A+B+C exits the longitudinal mixing section 8 and is withdrawn via a conduct 11 to a collection vessel 12. In the latter, the desired nanoformulation or respectively a dispersion comprising desired nanocarriers is collected. The distal end of the static mixer 4 comprises a dwelling section 20. The dwelling section 20 expands from end of either the contacting section 15 or the helically twisted channel 16 (FIG. 2) up to the aperture of the static mixer 4, here the pinhole aperture 10.

Additional components of apparatus 100 necessary for operation such as pumps, metering devices, measuring and control devices are not shown in simplified FIG. 1.

FIG. 2 shows a first embodiment of static mixer 41, 4 detailly. Left hand, inner edges of body are displayed in broken lines. Right hand shows a sectional view.

First embodiment of static mixer 41 is of substantially cylindrical shape despite of two tapered sections described below. On its proximal end, static mixer 41 is equipped with a pair of inlets 131, 132. The first inlet 131 is to be connected with first feed 5, while second inlet 132 is to be connected with the second feed 6. Through the respective inlets 131, 132 first liquid phase A and second liquid phase B are entering the mixer and are ducted inside separately via two parallel inlet ducts 141, 142 to a conical contacting section 15. Inside this contacting section 15, both liquid phases A and B are in first contact. Since the inlet ducts 141, 142 are arranged in parallel, contact angle of liquid phases A and B in conical contacting section is 0°. Each of the inlet ducts 141, 142 has an inner diameter of 0.5 to 2.5 mm. In the example of FIG. 2, the diameter is 1.0 mm.

Downstream of contacting section 15, a helically twisted channel 16 extends. The channel 16 has a rectangular cross section and is twisted helically around the central axis of the static mixer 41. Within this channel, liquid phases A and B are further blended to obtain biphasic mixture A+B. The contact time and intensity are determined by the length of the channel 16.

Due to the complex geometry of the helically twisted channel 16 having a multitude of undercuts static mixer 41 is produced by an additive manufacturing process. The material is to be selected according to chosen process, it may by a polymer resin or metal.

At its distal end, static mixer 41 is equipped with a pinhole aperture 10. Pinhole aperture 10 marks the narrowest diameter of the entire mixer 41. Diameter of pinhole aperture 10 amounts to 0.5 mm.

Thus, first embodiment is considered as a millifluidic device. The distal end of the static mixer 4 comprises a dwelling section 20 expanding from the end of the helically twisted channel 16 up to the pinhole aperture 10.

Biphasic mixture A+B exits pinhole aperture 10 and enters longitudinal mixing section 8 to be diluted with third liquid phase C (not shown in FIG. 2). Liquid phase C flows outside of the static mixer 41.

FIG. 3 shows a second embodiment of static mixer 42, 4. It is quite similar to first embodiment 41. However, diameter of pinhole aperture 10 is narrower than in first embodiment 41. In second embodiment of static mixer 42, diameter of pinhole aperture 10 amounts to 0.35 mm. This is still in range of millifluidic devices.

FIG. 4 shows a third embodiment of static mixer 43; 4. Left hand, inner edges of body are displayed in broken lines. Right hand shows a sectional view. This third embodiment 43 is characterized by inlet ducts 141, 142 being helically twisted, see enlarged detail. Thanks to helically twisted inlet ducts 141, 142 liquid phases A and B are entering contacting section 15 with a spin. This improves blending right at the beginning in the conical contacting section 15. It is worth to mention that liquid phases A and B are ducted individually through helically twisted inlet ducts 141, 142. There is no contact of first and second liquid phase before entering contacting section 15.

All other design elements of second embodiment of static mixer 43 are identical to those of the first embodiment of static mixer 41. It is made of the same material by the same process. Diameter of pinhole aperture 10 amounts to 0.5 mm.

FIG. 5 shows a fourth embodiment of static mixer 44, 4. Left hand, inner edges of body are displayed in broken lines.

Right hand shows a sectional view. This forth embodiment 44 is characterized by a baffle 17 located inside of the conical contacting section 15 (see enlarged detail). Baffle 17 improves mixing of A and B right on first contact. Complex geometry of baffle 17 requires additive manufacturing of forth embodiment 44.

All other design elements of third embodiment of static mixer 44 are identical to those of the first embodiment of static mixer 41. It is made of the same material by the same process. Diameter of pinhole aperture 10 amounts to 0.5 mm.

FIG. 6 shows a fifth embodiment of static mixer 45, 4. Left hand, inner edges of body are displayed in broken lines. Right hand shows a sectional view.

Fifth embodiment 45 is characterized by a restrictor 18 located inside of the conical contacting section 15. Restrictor 18 intensifies contact of liquid phases A and B and bridges the first part contacting section 15.1 throughout to the second part of contacting section 15.2. Restrictor 18 marks the smallest aperture inside the static mixer 45. Restrictor's diameter r amounts to 0.8 mm. This diameter is notably larger than typical inner diameters of micromixers. Hence, mixer 45 should rather be considered as a millifluidic mixer. The diameter of pinhole aperture 10 marks the exit of the mixer 45 and amounts to 1.5 mm.

All other design elements of forth embodiment of static mixer 4, 45 are identical to those of the first embodiment of static mixer 41. It is made of the same material by the same process. Each of the embodiments according to FIGS. 2 to 6 might be equipped with an aperture plate 22 placed between the contact section 15 and the subsequent helically twisted channel 15 and/or the dwelling section 20 formed as a capillary, whereby the aperture of the aperture plate 22 has an open diameter of 0.4 to 1.5 mm, ideally an open diameter of 0.5 to 0.8 mm.

FIG. 7 depicts the helically twisted, rectangular shaped channel 16 being a part of all embodiments 41, 42, 43, 44, 45 of static mixer 4. For illustrating complex geometry properly, FIG. 7 comprises three subdrawings. The subdrawing at the top is a drawing of a section of shaped channel 16 showing outer edges. Inner edges are represented by broken lines. In the subdrawings in the middle and the bottom, sectional views at different angles are displayed: The sectional view shown in the middle is rotated by 90° around axial axis toward the sectional view at the bottom. The axial arrangement of all subdrawings is identical.

Complex geometry shown in FIG. 7 can be achieved by torsion of a channel having a rectangular cross section around channel's longitudinal axis. In practice, such geometry is prepared by an additive manufacturing method such as stereolithography (SLA).

An alternative embodiment of setup of apparatus 100 and related process is shown schematically in FIG. 8. In this embodiment, third reservoir vessel 3 serves as collection vessel 12 as well. Hence, conduct 11 is redirected to the third reservoir vessel 3 such that third reservoir vessel 3, third feed 9, linear pipe 7 including mixing section 8 and conduct 11 establishing a closed cycle 19.

This cycle 19 is operated continuously: At start-up third reservoir vessel 3 contains third liquid phase C only. During operation triphasic mixture A+B+C is enriched within third reservoir 3/collection vessel 12.

Additional components of apparatus 100 necessary for operation such as pumps, metering devices, measuring and control devices are not shown in simplified FIG. 8.

An alternative usage of inventive apparatus is shown schematically in FIG. 9.

According to this, the third feed 9 is not used for feeding the third liquid phase C from third accommodation vessel 3 to the linear pipe 7. It is rather used for feeding the primary mixture A+B to the third accommodation vessel containing the third liquid phase C. Hence, the primary mixture A+B is contacted with the third liquid phase C in the third accommodation vessel 3 and not in the longitudinal mixing section 8. Thus, secondary mixture A+B+C is established in the third accommodation vessel 3. Therefore, third accommodation vessel 3 is used as collection vessel 12 for the secondary mixture A+B+C as well.

In this usage, mixer 4 is preferably arranged vertically and third accommodation vessel 3 is situated below mixer 4 (arrangement not shown). In such vertical arrangement, environmental air can be used as third feed 9: Biphasic primary mixture A+B is dropping down into collection vessel 12 to give triphasic, secondary mixture A+B+C.

FIGS. 10 to 11 are described together with Example Group 1 and FIG. 12 in Example Group 4 herein after.

Another alternative embodiment of setup of apparatus 100 and related process is shown schematically in FIG. 13. In this embodiment the four reservoir vessels 1, 2, 3 and 12 are arranged according to FIG. 2 including the related feeds 5, 6, 9 and the conduct 11.

In contrary to FIG. 2, the static mixer 4 is situated partly in the linear pipe 7 with a part of the distal end, namely a part of the conical distal end including the pinhole aperture 10. The feed 9 is divided in two or more subbranches before entering into the linear pipe 7. The linear pipe 7 has an outer diameter d' equal or smaller than the diameter d of the static mixer 4.

Additional components of apparatus 100 necessary for operation such as pumps, metering devices, measuring and control devices are not shown in simplified FIG. 8.

FIG. 14 shows in three subdrawings I. to III. three alternative beneficial embodiments (sixth embodiment) of the inventive static mixer 46 with expanded dwelling sections 20. The static mixer 4 according one of the subdrawings is in fluidic connection as described herein and designed in detail as e.g., described in one of the FIGS. 2 to 6.

As stated, this sixth embodiment of static mixer 46, 4 is characterized by an extended dwelling section 20 subsequent to the contacting section 15 or the contacting section 15 and a helically twisted channel 16. According the subdrawing I. the helically twisted channel 16 and the extended dwelling section 20 are placed in or formed by one common channel. Thus, the extended dwelling section 20 has more or less the same diameter d as the helically twisted channel 16. The geometry of the scare section of the section 20 is circular of an untwisted square.

In the subdrawing II. of FIG. 14 the extended dwelling section 20 is an appendix to the distal conical end and the pinhole aperture 10 of the static mixer 4. The static mixer 4 might be designed as provided in one of the FIGS. 2 to 6. The dwelling section 20 is formed as a capillary. The length of L of the dwelling section 20 in the shown example is 110 mm with an inner diameter of 1 mm. The linear pipe 7 has an outer diameter d' equal or smaller than the diameter d of the static mixer 4 and surrounds a distal part of the capillary dwelling section 20. The longitudinal mixing section 8 is formed by the linear pipe 7 as described herein.

Finally, the subdrawing III. of FIG. 14 provides an embodiment of the static mixer 4 having the contacting section 15, namely a conical contacting section 15 but no helically twisted channel 16. Thus, the conical contacting section 15 and or a second contacting section 15.2 subsequent to a restrictor 18 (not shown), is in direct fluidic connection with the extended dwelling section 20, formed as a capillary. As sketched by the block in dotted line, the capillary expanded dwelling section 20 can be arranged in a multiple helix to enable a maximum of dwelling time within little room. Length L of the dwelling section 20 is to be counted including the length of the entire length of the multiple helix.

The beneficial effect of the use of the extended dwelling section 20 results in an increasing RNA encapsulation efficiency of roughly 40% compared to a static mixer without such extended dwelling section 20.

All other design elements of sixth embodiment of static mixer 46 according one of the subdrawings I. to III. are comparable or identical to those of the first to the fifth embodiment of static mixer 4 (FIGS. 2 to 6) and is made of the same or comparable materials by the same process.

EXAMPLES

The processes according to the invention will now be more particularly elucidated with reference to experimental examples. Table 1 contains an overview of the examples.

Preparation of Mixer

Within the examples, five inventive embodiments of a static mixer have been compared with conventional mixers. The inventive ones have been prepared by stereolithography (SLA) based on Formiabs® Form3L system (for resin materials) or selective laser melting (SLM) based on 3D Systems ProX DMP 320 (for metal materials). All inventive static mixers have been made of either 3D-printing resins Formlabs® Rigid 10 K, Formlabs® Clear Resin or stainless steel 1.4404 also known as 316L.

Design of inventive mixers is derivable from the FIGS. 2 to 6 explained above. FIG. 7 applies to all inventive mixers used in the examples.

Design of non-inventive embodiments of Group 1 and Group 2 is derivable from FIGS. 2, 2*x* and 2*z* of WO 2022/194615 A1. In case where no static mixer has been used, apparatus of WO 2022/194615 A1 was used as is. In case where static mixer was employed, static mixer was coupled to the outlet of the pipelines of apparatus of WO 2022/194615 A1.

Assesed Performance Parameters

For assessment of performance, the following parameters have been determined in the course of the examples:
average particle size (Zav)
Polydispersity index (PDI),
Particle Homogeneity,
Encapsulation Efficiency.

Zav and PDI have been measured using dynamic light scattering.

Particle Homogeneity has been examined by means of Cryo-TEM analysis.

Encapsulation Efficiency has been determined by means of Nucleic Acid Quantitation pre and post particle disintegration.

TABLE 1

Overview of examples

| Example Group | no. | Character Type | Static mixer Embodiment No. | First liquid phase Dispersion Medium/ Buffer | Active ingredient | Second liquid phase Dispersion medium/ Buffer | Nanocarrier precursor | Third liquid phase Dispersion medium | Performance Evaluated Parameters |
|---|---|---|---|---|---|---|---|---|---|
| 1 | 1 | Non-inventive | No static mixer | Citric buffer 50 mM | Poly A | Ethanole | DODMA, DSPC, PEG-DMG, Cholesterol | Phosphate buffer pH 7.4 | Particle Homogeneity |
| 1 | 2 | Non-inventive | Static mixer | Citric buffer 50 mM | Poly A | Ethanole | DODMA, DSPC, PEG-DMG, Cholesterol | Phosphate buffer pH 7.4 | Particle Homogeneity |
| 2 | 1 | Non-inventive | No static mixer | Citric buffer 50 mM | Poly A | Ethanole | DODMA, DSPC, PEG-DMG, Cholesterol | Phosphate buffer pH 7.4 | Encapsulation Efficiency |
| 2 | 2 | Non-inventive | Static mixer | Citric buffer 50 mM | Poly A | Ethanole | Dlin-MC3-DMA, DSPC, PEG-DMG, Cholesterol | Phosphate buffer pH 7.4 | Encapsulation Efficiency |
| 3 | 1 | Inventive | Static mixer according to FIG. 2/first embodiment | Citric buffer 50 mM | Poly A | Ethanole | Dlin-MC3-DMA, DSPC, PEG-DMG, Cholesterol | Phosphate buffer pH 7.4 | Particle size and Polydispersity index |
| 3 | 2 | Inventive | Static mixer according to FIG. 3/second embodiment | Citric buffer 50 mM | Poly A | Ethanole | Dlin-MC3-DMA, DSPC, PEG-DMG, Cholesterol | Phosphate buffer pH 7.4 | Particle size and Polydispersity index |
| 3 | 3 | Inventive | Static mixer according to FIG. 4/third embodiment | Citric buffer 50 mM | Poly A | Ethanole | Dlin-MC3-DMA, DSPC, PEG-DMG, Cholesterol | Phosphate buffer pH 7.4 | Particle size and Polydispersity index |
| 3 | 4 | Inventive | Static mixer according to FIG. 5/fourth embodiment | Citric buffer 50 mM | Poly A | Ethanole | Dlin-MC3-DMA, DSPC, PEG-DMG, Cholesterol | Phosphate buffer pH 7.4 | Particle size and Polydispersity index |
| 3 | 5 | Inventive | Static mixer according to FIG. 6/fifth embodiment | Citric buffer 50 mM | Poly A | Ethanole | Dlin-MC3-DMA, DSPC, PEG-DMG, Cholesterol | Phosphate buffer pH 7.4 | Particle size and Polydispersity index |
| 4 | 1 | Inventive | Static mixer according to FIG. 6/fifth embodiment | Citric buffer 50 mM | Poly A | Ethanole | Dlin-MC3-DMA, DSPC, PEG-DMG, Cholesterol | Phosphate buffer pH 7.4 | Particle size, Polydispersity index, Particle Homogeneity, Encapsulation Efficiency |

TABLE 1-continued

Overview of examples

| Example Group | Character no. | Static mixer Type | Static mixer Embodiment No. | First liquid phase Dispersion Medium/ Buffer | First liquid phase Active ingredient | Second liquid phase Dispersion medium/ Buffer | Second liquid phase Nanocarrier precursor | Third liquid phase Dispersion medium | Performance Evaluated Parameters |
|---|---|---|---|---|---|---|---|---|---|
| 5 | 1 | Inventive | Static mixer without extended dwelling section | Citric buffer 50 mM | CleanCap Fluc mRNA | Ethanole | Dlin-MC3-DMA, DSPC, PEG-DMG, Cholesterol | Phosphate buffer pH 7.4 | Encapsulation Efficiency |
| 5 | 2 | Inventive | Static mixer with 110 cm dwelling section | Citric buffer 50 mM | CleanCap Fluc mRNA | Ethanole | Dlin-MC3-DMA, DSPC, PEG-DMG, Cholesterol | Phosphate buffer pH 7.4 | Encapsulation Efficiency |

Legend for table 1:
Poly A = polyadenosine monophosphate
DODMA = 1,2-dioleyloxy-3-dimethylaminopropane
DSPC = 1,2-Distearoyl-sn-glycero-3-phosphocholine
PEG-DMG = 1,2-Dimyristoyl-rac-glycero-3-methoxypolyoxyethylene Example Group 1

In example group 1 the impact of the static mixer 4 according to FIG. 2 for lipid nanoparticle (LNP) manufacture in the conventional apparatus is evaluated on the basis of particle homogeneity. Particle homogeneity is a crucial quality attribute for pharmaceutical formulations based on LNPs.

Therefore, examples are shown in which LNPs are manufactured without and with the use of a static mixer 4. The evaluation is based on Cryo-TEM analysis by utilizing a Zeiss Libra 120 Plus at 120 kV accelerating voltage in combination with a Gatan UltraScan® ccd camera. The static mixer 4 comprises the following dimensions: a length of the helically twisted channel 16 of 40 mm and a subsequent dwelling section 20 of 8-15 mm length.

The model formulations consist of an ethanolic lipid mixture containing DODMA, DSPC, Cholesterol and PEG-DMG at 50/10/38.5/1.5 mol %. As a suitable surrogate for mRNA a polyadenylic acid, namely polyadenosine monophosphate (Poly A, Cytiva) was used in citric buffer pH 4.0. The N/P ratio of the final product was 3:1. In both cases the ethanolic lipid solution was added at 15 ml/min and the aqueous buffer containing the RNA-surrogate at 45 ml/min. Results are shown in FIGS. 10 and 11:

FIG. 10: Results of Cryo-TEM analysis/Particles prepared without static mixer (prior art).

FIG. 11: Results of Cryo-TEM analysis/Particles prepared with static mixer (inventive). The Cryo-TEM image of a product manufactured without static mixing elements (FIG. 10) shows a heterogenic particle population. A significant ratio of the particles are agglomerated and show also differences in contrast as a hint toward unequal distribution of active loading. If a static mixing element is added, particles show to be much more homogeneous and of a comparable contrast/density (FIG. 11).

Example Group 2

In example group 2 the impact of the static mixer according FIG. 2 for lipid nanoparticle (LNP) manufacture in conventional apparatus is evaluated on the basis of encapsulation efficiency. Encapsulation efficiency is the ratio of utilized active [%] which was packed successfully into the lipid nanoparticle and is not on the surface of the particle or free in the product solution where it would be accessible for a fluorescent dye, which es able to mark the active for a fluorescent readout. Encapsulation efficiency is a crucial quality attribute for pharmaceutical formulations based on LNPs.

Therefore, examples are shown in which LNPs are manufactured without and with the use of a static mixer 4. The evaluation is based on Nucleic Acid Quantitation using a Quant-IT RiboGreen assay-kit (Thermo-Scientific). The read out was performed by using an Infinite 200 Pro (Tecan). The static mixer 4 comprises the following dimensions: a length of the helically twisted channel 16 of 40 mm and a subsequent dwelling section 20 of 8-15 mm length.

The model formulations consist of either an ethanolic lipid mixture containing DODMA, DSPC, Cholesterol and PEG-DMG at 50/10/38.5/1.5 mol % or Dlin-MC3-DMA, DSPC, Cholsterol and PEG-DMG at 50/10/38.5/1.5 mol %. As a suitable surrogate for mRNA a polyadenylic acid, namely polyadenosine monophosphate (Poly A, Cytiva) was used in citric buffer pH 4.0. The N/P ratio of the final product was 3:1. In both cases the ethanolic lipid solution was added at 15 ml/min and the aqueous buffer containing the RNA-surrogate at 45 ml/min.

The encapsulation efficiency could be increased from 80.9% to 93.7% by the implementation of a static mixer 4.

Example Group 3

In example group 3 the optimization of the design of the static mixer 4 is described. Crucial for parenteral application of LNPs is the ability to perform a sterilization of the product by sterile filtration. For that purpose, the average particle size (Zav) should be significant below 0.2 µm, which is the standard filter size in sterile filtration. The target particle size for the optimization is 50-150 nm, preferably 80-120 nm. In addition, polydispersity index (PDI) should be below 0.2 indicating for a narrow size variation and high product quality.

For this purpose, various static mixers (embodiments shown in FIGS. 1 to 5) were tested in the apparatus shown in FIG. 2 of WO 2022/194615 A1 to manufacture LNPs.

The average particle size (Zav) and polydispersity index (PDI) are measured by the principle of dynamic light scattering with a Zetasizer instrument from Malvern Panalytical Ltd, GB.

The model formulations consist of an ethanolic lipid mixture containing Dlin-MC3-DMA, DSPC, Cholsterol and PEG-DMG at 50/10/38.5/1.5 mol %. As a suitable surrogate for mRNA a polyadenylic acid, namely polyadenosine monophosphate (Poly A, Cytiva) was used in citric buffer pH 4.0. The N/P ratio of the final product was 4:1. In all cases the ethanolic lipid solution was added at 15 ml/min and the aqueous buffer containing the RNA-surrogate at 45 ml/min. Results are shown in Table 2.

TABLE 2

Particle size (and polydispersity index in relation to the used static mixing structure

| Static mixer | Zav [nm] | PDI |
|---|---|---|
| First Embodiment/FIG. 2 | 145.9 | 0.143 |
| Second Embodiment/FIG. 2 | 136.8 | 0.110 |
| Third Embodiment/FIG. 4 | 136.4 | 0.176 |
| Forth Embodiment/FIG. 5 | 126.6 | 0.082 |
| Fifth Embodiment/FIG. 6 | 103.5 | 0.126 |

At the chosen process parameters and formulation, all static mixers were able to generate particles in the targeted size and polydispersity range. The use of static mixer according to the fifth embodiment resulted in particles within the preferred size range.

Example Group 4

In example group 4, results of an additional trial setup with the optimized static mixer 4 are shown containing results for the mayor LNP quality attributes average size, PDI, encapsulation efficiency and particle homogeneity.

For this purpose, the fifth embodiment of the static mixer (FIG. 6) was tested in the apparatus shown in FIG. 2 of WO 2022/194615 A1 to manufacture LNPs. The analytical methods and apparatus are described in example group 1-3. The static mixer 4 comprises the following dimensions: a length of the helically twisted channel 16 of 40 mm and a subsequent dwelling section 20 of 8-15 mm length.

The model formulations consist of an ethanolic lipid mixture containing Dlin-MC3-DMA, DSPC, Cholsterol and PEG-DMG at 50/10/38.5/1.5 mol %. As a suitable surrogate for mRNA a polyadenylic acid namely polyadenosine monophosphate (Poly A, Cytiva) was used in citric buffer pH 4.0. The N/P ratio of the product was 4:1. The ethanolic lipid solution was added at 15 ml/min and the aqueous buffer containing the RNA-surrogate at 45 ml/min. Results are shown in Table 3.

TABLE 3

Analytical results for a LNP formulation manufactured with optimized static mixer 4.

| Parameter | Result |
|---|---|
| Average Particle size (Zav) | 106.7 nm |
| Polydisperity index (PDI) | 0.128 |
| Encapsulation efficiency | 92.63% |
| Homogeneity (Cryo-TEM image) | FIG. 12 |

With the application of the fifth embodiment in the LNP production process, particles within the target range for size and PDI could be achieved. The resulting LNPs show very high encapsulation efficiency and are homogeneous in terms of microscopical appearance (see FIG. 12).

FIG. 12: Results of Cryo-TEM analysis/Particles prepared with optimized static mixer setup.

Example Group 5

In example group 5, results of an additional trial setup with an optimized static mixer are shown. This setup is characterized by the introduction of a prolonged post mixing zone, named as extended or expanded dwelling section, for the primary mixture A+B without fluid C. Therefore, a capillary is added at the distal end of the static mixer 4, prolonging the dwelling length to 110 cm at 1 mm inner diameter, prior to release into the linear tube 7 and the longitudinal mixing section 8. By this, more complex loads such as mRNA having a secondary structure, are encapsulated at higher efficiency than without prolongation of the dwelling section. The static mixer 4 including the helically twisted channel 16 and a first section of the extended dwelling section formed as a 10 cm capillary (dwelling section 20), was manufactured by 3D printing of stainless steel 1.4404 also known as 316L metal. The capillary forming the second section of the extended dwelling section 20 was coupled by a screw connection and having a length of 100 cm, whereby roughly ⅘ of the extended dwelling section 20 was formed as a helix concentrically winded round the longitudinal axis of the static mixer 4.

In the example group 5.1 the static mixer 4 comprises the dimensions according example group 4 and in the example group 5.2 an extended subsequent dwelling section 20 of 110 mm length Regarding this surprising effect it is hypothesized that formation of the complex inner structure of lipid nanoparticles is dependent on the cargo and faster in case of less complex loads such as short chained siRNA or linear synthetic RNA surrogates, but for more complex loads such as mRNA a premixing time at pH 4 to mature lipid nanoparticles is necessary. The parameter to assess the successful formation of the lipid nanoparticle is encapsulation efficiency.

For this purpose, an apparatus according to the embodiment according to FIG. 14 III. in combination with the fifth embodiment of the static mixer (FIG. 6) with and without an extended dwelling section was tested to manufacture LNPs. Encapsulation efficiency was assessed as described in example group 2.

The model formulations consist of an ethanolic lipid mixture containing Dlin-MC3-DMA, DSPC, Cholsterol and PEG-DMG at 50/10/38.5/1.5 mol %. CleanCap Fluc-mRNA (tebubio) was used in citric buffer pH 4.0. The N/P ratio of the product was 6:1. The ethanolic lipid solution was added at 25 ml/min and the aqueous buffer containing the RNA-surrogate at 75 ml/min.

As a result the encapsulation efficiency of CleanCap Fluc mRNA was increased from 51.8% without dwelling section for the static mixture A+B to 91.2%, if an extended dwelling section was introduced to the setup.

REFERENCES

0 Apparatus
1 first reservoir vessel
2 second reservoir vessel
3 third reservoir vessel
4 static mixer
41 first embodiment of static mixer
42 second embodiment of static mixer
43 third embodiment of static mixer 44 forth embodiment of static mixer
45 fifth embodiment of static mixer
5 first feed
6 second feed
7 linear pipe
8 longitudinal mixing section
9 third feed
10 pinhole aperture
11 conduct
12 collection vessel
131 first inlet
132 second inlet
141 first inlet duct
142 second inlet duct
15 contacting section (also 15.1, 15.2)
16 helically twisted channel
17 baffle
18 restrictor
19 cycle
20 dwelling section
21 helix section of dwelling section
A first liquid phase
B second liquid phase
C third liquid phase
A+B primary mixture
A+B+C secondary mixture
d outer diameter of static mixer
d' outer diameter of linear pipe
D inner diameter of linear pipe
l length of linear mixing section
L length of dwelling section
r diameter of restrictor

The invention claimed is:

1. An apparatus for producing a nanocarrier and/or a nanoformulation, the apparatus comprising:
- a static mixer having a contacting section and downstream of contacting section, a helically twisted channel extends;
- a linear pipe, whereby at least a distal section of the static mixer is surrounded by the linear pipe;
- a longitudinal mixing section, whereby the static mixer and the linear pipe establish the longitudinal mixing section, which extends downstream from the static mixer inside the linear pipe up to an end of the linear pipe;
- a first inlet of the static mixer for accommodating a first liquid phase from a first reservoir vessel via a first feed;
- a second inlet of the static mixer for accommodating a second liquid phase from a second reservoir vessel via a second feed;
- an inlet of the linear pipe for accommodating a third liquid phase to the longitudinal mixing section from a third reservoir vessel via a third feed;
- the linear pipe forming at least a part of said third feed and said longitudinal mixing section;
- wherein the first inlet and second inlet are in fluid communication with the contacting section, the contacting section is receiving the first liquid phase and the second liquid phase in absence of the third phase, and whereby the static mixer is providing an at least biphasic primary mixture by mixing the first liquid phase with the second liquid phase in absence of the third phase;
- the longitudinal mixing section is providing an at least triphasic secondary mixture by mixing said primary mixture with said third liquid phase;
- a collection vessel for accommodating the secondary mixture;
- a conduct, by which the longitudinal mixing section is in fluid communication with the collection vessel;
- wherein at least a distal section of the static mixer is arranged inside said linear pipe, wherein the static mixer has a conical contacting section.

2. The apparatus as claimed in claim 1, wherein conical contacting section comprises a restrictor.

3. The apparatus as claimed in claim 1, wherein the linear pipe and the static mixer are arranged vertically.

4. The apparatus as claimed in claim 1, wherein the static mixer comprises the helically twisted channel having a rectangular cross section and/or a staggered arrangement of static mixing elements.

5. The apparatus as claimed in claim 1, characterized by two inlet ducts arranged in parallel inside of the static mixer.

6. The apparatus as claimed in claim 1, wherein the static mixer has an extended dwelling section at the distal end.

7. The apparatus as claimed in claim 1, wherein the static mixer has a pinhole aperture projecting into the direction of a central axis of the linear pipe, wherein the pinhole aperture marks a most-narrow constriction of the static mixer, wherein a diameter of the pinhole aperture is from 0.1 to 1 mm.

8. The apparatus as claimed in claim 1, wherein the collection vessel for accommodating the secondary mixture and the third reservoir vessel for accommodating the third liquid phase are designed as a combined vessel.

9. The apparatus as claimed in claim 8, wherein the combined vessel, the third feed, the longitudinal mixing section, and the conduct form a circle line including a circulating pump for circulating the secondary mixture.

10. The apparatus as claimed in claim 1, fulfilling at least one feature selected from the group consisting of features (i), (ii), and (iii):
- (i) the first feed comprises a metering device for dosing the first liquid phase into the static mixer;
- (ii) the second feed comprises a metering device for dosing the second liquid phase into the static mixer; and
- (iii) the third feed comprises a metering device for dosing the third liquid phase into the longitudinal mixing section.

11. A process for producing a nanocarrier and/or a nanoformulation, the process comprising:
- a) providing an apparatus according to claim 1;
- b) providing the first liquid phase in the first reservoir vessel, wherein the first liquid phase comprises a first liquid dispersion medium and at least one component selected from the group consisting of a precursor to the nanocarrier, an active ingredient, and a precursor to an active ingredient;
- c) providing the second liquid phase in the second reservoir vessel, wherein the second liquid phase comprises a second liquid dispersion medium and at least one component selected from the group consisting of a precursor to the nanocarrier, a precursor to an active ingredient, and an active ingredient;
- d) providing the third liquid phase in the third reservoir vessel, wherein the third liquid phase comprises a third liquid dispersion medium;
- e) establishing a first liquid flow from the first reservoir vessel via the first feed into the static mixer;
- f) establishing a second liquid flow from the second reservoir vessel via the second feed into the static mixer;
- g) establishing a third liquid flow from the third reservoir vessel via the third feed into the longitudinal mixing section, wherein a volume flow of the third liquid flow is larger than a sum of a volume flow of the first liquid flow and a volume flow of the second liquid flow;

h) mixing the first liquid phase and the second liquid phase in the static mixer in absence of the third phase so as to obtain an at least biphasic mixture containing the nanocarrier and/or a nanoformulation or precursors thereof;

i) mixing the biphasic mixture with the third liquid phase in the longitudinal mixing section so as to obtain an at least triphasic mixture containing the nanocarrier and/or nanoformulation and the third liquid dispersion medium;

k) conducting the triphasic mixture from the longitudinal mixing section to the collection vessel through the conduct;

l) Collecting the triphasic mixture in the collection vessel;

m) withdrawing the triphasic mixture from the apparatus;

n) optionally working up the triphasic mixture.

12. The process as claimed in claim 11, wherein a pH of the first liquid phase is between 3 and 5; wherein a pH of the third liquid phase is either between 6 and 8 or between 3 and 5; all pH values are as measured at a temperature of 25° C. by a glass electrode.

13. The process as claimed in claim 12, wherein the first dispersion medium is water or an aqueous buffer, the second dispersion medium is an organic substance, and the third dispersion medium is water or an aqueous buffer.

14. The process as claimed in claim 13, wherein the organic substance is a monohydric or polyhydric alcohol.

15. The process as claimed in claim 13, wherein the second liquid phase comprises at least one precursor to the nanocarrier, wherein said precursor to the nanocarrier is a natural or artificial lipid.

16. The process as claimed in claim 15, whereby the natural or artificial lipid is selected from the group consisting of cholesterol, 1,2-dioleyloxy-3-dimethylaminopropane (DODMA), 1,2-Dimyristoyl-rac-glycero-3-methoxypolyoxyethylene (PEG-DMG), dilinoleylmethyl-4-dimethylaminobutyrate (Dlin-MC3-DMA), and 1,2-Distearoyl-sn-glycero-3-phosphocholine (DSPC).

17. The process as claimed in claim 11, wherein the third liquid phase comprises a buffer.

18. The process as claimed in claim 11, wherein the collection vessel for accommodating the secondary mixture and the third reservoir vessel for accommodating the third liquid phase are designed as a combined vessel, and wherein the third liquid phase is circulated before or during a metered addition of the first liquid phase and the second liquid phase.

19. The process as claimed in claim 11, wherein lipid nanoparticles are produced.

* * * * *